(12) United States Patent
Gaskins

(10) Patent No.: US 7,770,042 B2
(45) Date of Patent: Aug. 3, 2010

(54) MICROPROCESSOR WITH IMPROVED PERFORMANCE DURING P-STATE TRANSITIONS

(75) Inventor: Darius D. Gaskins, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 593 days.

(21) Appl. No.: 11/761,056

(22) Filed: Jun. 11, 2007

(65) Prior Publication Data

US 2007/0250736 A1 Oct. 25, 2007

Related U.S. Application Data

(63) Continuation-in-part of application No. 10/816,020, filed on Apr. 1, 2004, now Pat. No. 7,302,599, and a continuation-in-part of application No. 10/646,988, filed on Aug. 22, 2003, now abandoned, and a continuation-in-part of application No. 10/816,004, filed on Apr. 1, 2004, now Pat. No. 7,290,156.

(60) Provisional application No. 60/544,206, filed on Feb. 12, 2004, provisional application No. 60/415,942, filed on Oct. 3, 2002, provisional application No. 60/530,323, filed on Dec. 17, 2003, provisional application No. 60/892,303, filed on Mar. 1, 2007, provisional application No. 60/892,306, filed on Mar. 1, 2007, provisional application No. 60/892,300, filed on Mar. 1, 2007, provisional application No. 60/892,548, filed on Mar. 2, 2007.

(51) Int. Cl.
*G06F 1/00* (2006.01)
*H03B 19/00* (2006.01)

(52) U.S. Cl. ........................ 713/322; 713/300; 713/310; 713/320; 713/321; 713/323; 713/324; 702/106; 702/107; 365/226; 365/227

(58) Field of Classification Search .................. 713/300, 713/310, 320–324; 702/106–107; 365/226, 365/229
See application file for complete search history.

(56) References Cited

U.S. PATENT DOCUMENTS 5,367,638 A 11/1994 Niessen et al.

(Continued)

FOREIGN PATENT DOCUMENTS

CN 1332398 A 1/2002

(Continued)

OTHER PUBLICATIONS

Rotem et al. "Analysis of Thermal Monitor Features of the Intel Pentium M Processor." Downloaded from http://www.cs.virginia.edu/~skadron/tacs/men.pdf on Mar. 7, 2007.

(Continued)

*Primary Examiner*—Abdelmoniem Elamin
(74) *Attorney, Agent, or Firm*—E. Alan Davis; James W. Huffman

(57) ABSTRACT

A microprocessor includes core logic that operates according to a core clock signal in order to execute program instructions, clock generation circuitry controllable to generate the core clock signal having one of N different possible frequencies, wherein N is more than two, and a control circuit. The control circuit, in response to a request to operate the core logic at a destination frequency, iteratively controls the clock generation circuitry to generate the core clock signal having a new frequency until the core clock signal frequency is the destination frequency. The new core clock signal frequency on each iteration is one of the N different possible frequencies monotonically closer to the destination frequency. The number of iterations is between zero and N−1 depending upon the destination frequency specified and the core clock signal frequency when the request is received.

27 Claims, 15 Drawing Sheets

U.S. PATENT DOCUMENTS

| | | | |
|---|---|---|---|
| 5,422,832 | A | 6/1995 | Moyal |
| 5,451,892 | A | 9/1995 | Bailey |
| 5,544,138 | A | 8/1996 | Bajorek et al. |
| 5,557,557 | A | 9/1996 | Frantz et al. |
| 5,719,800 | A | 2/1998 | Mittal et al. |
| 5,815,724 | A | 9/1998 | Mates |
| 5,926,641 | A | 7/1999 | Shay |
| 5,936,820 | A | 8/1999 | Umemura et al. |
| 5,940,786 | A | 8/1999 | Steeby |
| 5,974,557 | A | 10/1999 | Thomas et al. |
| 5,996,083 | A | 11/1999 | Gupta et al. |
| 6,163,583 | A | 12/2000 | Lin et al. |
| 6,172,611 | B1 | 1/2001 | Hussain et al. |
| 6,191,546 | B1 | 2/2001 | Bausch et al. |
| 6,233,691 | B1 | 5/2001 | Atkinson |
| 6,243,656 | B1 | 6/2001 | Arai et al. |
| 6,259,293 | B1 | 7/2001 | Hayase et al. |
| 6,384,733 | B1 | 5/2002 | Seesemann |
| 6,415,388 | B1 | 7/2002 | Browning et al. |
| 6,438,697 | B2 | 8/2002 | Atkinson |
| 6,448,834 | B2 | 9/2002 | Takaki |
| 6,487,668 | B2 | 11/2002 | Thomas et al. |
| 6,515,530 | B1 | 2/2003 | Boerstler et al. |
| 6,535,798 | B1 | 3/2003 | Bhatia et al. |
| 6,609,211 | B2 | 8/2003 | Atkinson |
| 6,671,175 | B1 | 12/2003 | Chen |
| 6,691,055 | B2 | 2/2004 | Walter et al. |
| 6,754,837 | B1 | 6/2004 | Helms |
| 6,829,713 | B2 | 12/2004 | Cooper et al. |
| 6,836,849 | B2 | 12/2004 | Brock et al. |
| 6,859,882 | B2 | 2/2005 | Fung |
| 6,885,233 | B2 | 4/2005 | Huard et al. |
| 6,948,082 | B2 | 9/2005 | Gschwind et al. |
| 7,006,943 | B1 | 2/2006 | Mitchell et al. |
| 7,017,061 | B2 | 3/2006 | Lippert et al. |
| 7,019,577 | B2 | 3/2006 | Agrawal et al. |
| 7,069,463 | B2 | 6/2006 | Oh |
| 7,210,054 | B2 | 4/2007 | Jahagirdar et al. |
| 7,228,242 | B2 | 6/2007 | Read et al. |
| 7,237,128 | B2 | 6/2007 | Naveh et al. |
| 7,287,153 | B1 | 10/2007 | Hamersley |
| 7,430,676 | B2 | 9/2008 | Baker et al. |
| 7,590,509 | B2 | 9/2009 | Riedlinger et al. |
| 7,698,583 | B2 | 4/2010 | Gaskins et al. |
| 2001/0003207 | A1 | 6/2001 | Kling et al. |
| 2003/0028816 | A1 | 2/2003 | Bacon |
| 2003/0071657 | A1 | 4/2003 | Soerensen et al. |
| 2003/0110423 | A1 | 6/2003 | Helms et al. |
| 2003/0212474 | A1 | 11/2003 | Pippin |
| 2003/0234778 | A1 | 12/2003 | Kim |
| 2004/0260957 | A1 | 12/2004 | Jeddeloh et al. |
| 2005/0044429 | A1 | 2/2005 | Gaskins et al. |
| 2005/0076257 | A1 | 4/2005 | Fischer et al. |
| 2005/0091548 | A1 | 4/2005 | George et al. |
| 2005/0138444 | A1 | 6/2005 | Gaskins et al. |
| 2005/0178133 | A1 | 8/2005 | Henry et al. |
| 2005/0182983 | A1 | 8/2005 | Gaskins et al. |
| 2006/0156040 | A1 | 7/2006 | Naveh et al. |
| 2006/0254296 | A1 | 11/2006 | Finkelstein et al. |
| 2007/0061599 | A1* | 3/2007 | Mentzer et al. ............ 713/300 |
| 2007/0234100 | A1* | 10/2007 | Baker et al. ................ 713/600 |
| 2008/0262777 | A1* | 10/2008 | Kim et al. .................. 702/117 |

FOREIGN PATENT DOCUMENTS

| | | |
|---|---|---|
| CN | 1438533 | 8/2003 |
| JP | 07209091 A | 8/1995 |
| KR | 20030019742 | 3/2003 |
| TW | 0548534 B | 8/2003 |
| TW | 573760 | 1/2004 |

OTHER PUBLICATIONS

Intel 64 and IA-32 Architectures Software Developer's Manual. vol. 3A: System Programming Guide, Part 1. Nov. 2006. pp. 13-1, and 13-5 to 13-15.

Intel Pentium M Processor with 2-MB L2 Cache and 533-MHz Front Side Bus. Datasheet. Jul. 2005. pp. 14 and 62-64.

Wireless Intel SpeedStep Power Manager. "Optimizing power consumption for the Intel PXA27x processor family." Intel. 2004. pp. 1-16.

"Enhanced Intel SpeedStep Technology for the Intel Pentium M Processor." Intel. Mar. 2004. pp. 1-12.

* cited by examiner

A P-state transition from the lowest P-state to the highest P-state requires 25 VID changes, each 16mV and each requiring approximately 15 microseconds for a total of approximately 375 microseconds.

MICROPROCESSOR WITH IMPROVED PERFORMANCE DURING P-STATE TRANSITIONS

CROSS REFERENCE TO RELATED APPLICATIONS

This application is a continuation-in-part of the following Applications each of which is incorporated by reference herein in its entirety for all purposes and each of which was owned or subject to an obligation of assignment to VIA Technologies, Inc. or one of its wholly-owned subsidiaries at the time the invention claimed herein was made:

| Ser. No. | Filing Date | Title |
| --- | --- | --- |
| 10/816,020 Now U.S. Pat. No. 7,302,599 | Apr. 1, 2004 | INSTANTANEOUS FREQUENCY-BASED MICROPROCESSOR POWER MANAGEMENT |
| 10/646,988 Now Abandoned | Aug. 22, 2003 | RESOURCE UTILIZATION MECHANISM FOR MICROPROCESSOR POWER MANAGEMENT |
| 10/816,004 Now U.S. Pat. No. 7,290,156 | Apr. 1, 2004 | FREQUENCY-VOLTAGE MECHANISM FOR MICROPROCESSOR POWER MANAGEMENT |

Application Ser. No. 10/816,020, now U.S. Pat. No. 7,302,599, claims priority to Provisional Application 60/544,206, filed Feb. 12, 2004, which is hereby incorporated by reference in its entirety for all purposes.

Application Ser. No. 10/646,988, now abandoned, claims priority to Provisional Application 60/415,942, filed Oct. 3, 2002, which is hereby incorporated by reference in its entirety for all purposes.

Application Ser. No. 10/816,004, now U.S. Pat. No. 7,290,156, claims priority to Provisional Application 60/530,323, filed Dec. 17, 2003, which is hereby incorporated by reference in its entirety for all purposes.

This application claims priority to the following Provisional Applications, each of which is incorporated by reference herein in its entirety for all purposes:

| Ser. No. | Filing Date | Title |
| --- | --- | --- |
| 60/892,300 (CNTR.2308) | Mar. 1, 2007 | A METHOD AND APPARATUS FOR CONSIDERING TEMPERATURE IN VOLTAGE AND FREQUENCY ADJUSTMENTS ON A MICROPROCESSOR (PARALLAX) |
| 60/892,303 (CNTR.2311) | Mar. 1, 2007 | ITERATIVE APPROACH TO OPERATING POINT TRANSITIONS |
| 60/892,306 (CNTR.2318) | Mar. 1, 2007 | TM3 |
| 60/892,548 (CNTR.2325) | Mar. 2, 2007 | OVERSTRESS MODE |

This application is related to the following Applications which are concurrently filed herewith:

| Ser. No. | Filing Date | Title |
| --- | --- | --- |
| 11/761,044 (CNTR.2308) | Jun. 11, 2007 | MICROPROCESSOR CAPABLE OF DYNAMICALLY REDUCING ITS POWER CONSUMPTION IN RESPONSE TO VARYING OPERATING TEMPERATURE |
| 11/761,076 (CNTR.2318) | Jun. 11, 2007 | MICROPROCESSOR WITH IMPROVED THERMAL MONITORING AND PROTECTION MECHANISM |
| 11/761,096 (CNTR.2325) | Jun. 11, 2007 | MICROPROCESSOR CAPABLE OF DYNAMICALLY INCREASING ITS PERFORMANCE IN RESPONSE TO VARYING OPERATING TEMPERATURE |

BACKGROUND OF THE INVENTION

Field of the Invention

The present invention relates in general to the field of the interplay between power consumption and performance in microprocessors, and particularly to the reduction of the former and the increase of the latter with respect to the operating temperature of the microprocessor.

Power consumption management is an important issue for several types of computing systems, including portable devices, laptop computers, desktops, and servers. Battery life, for example, is a significant issue for most laptop computer users. Furthermore, it has been reported that in many data centers the energy cost of operating a server over its lifetime is greater than the purchase price of the server itself. Furthermore, there is a demand for the so-called "green" computers. The microprocessor may consume a significant amount of the power consumed by the computing system. Therefore, the microprocessor is often the target of power reduction techniques.

For a given microprocessor design, the core clock frequency largely determines the performance the microprocessor delivers to its user, i.e., the amount of instructions the microprocessor can execute in a given amount of time. Many systems that employ microprocessors require a certain level of performance, and the level may vary over time during operation of the system. For example, many modern microprocessors include the ability for system software, such as the BIOS or operating system, to dynamically specify a particular performance level by specifying the operating frequency of the microprocessor.

The dynamic power consumption of a microprocessor is proportional to the frequency of its core clock signal and to the square of its operating voltage. However, it is well known that the physical properties of most modern microprocessors are such that for each frequency at which the microprocessor may be operated, a minimum voltage level at the frequency must be supplied to the microprocessor or else it will fail to operate properly. Therefore, what is needed is a way to reduce the power consumed by a microprocessor at a required performance/frequency level by reducing the operating voltage.

Furthermore, there is a constant demand from consumers to receive higher performance from microprocessors. As discussed herein, all other things being equal, the higher the frequency at which a microprocessor operates the higher the performance the microprocessor will deliver. Consequently, a popular method of increasing the performance of microprocessors is what is commonly referred to as "overclocking." Traditionally, computer enthusiasts overclock a system by increasing the clock frequency of the front side bus of the microprocessor, which causes the microprocessor and other circuits connected to the front side bus to operate at the higher clock frequency. Overclocking has several drawbacks. First, overclocking a system invariably requires the overclocker to augment or replace the standard cooling system provided by the computer system manufacturer with a higher capacity cooling system, such as higher velocity and/or larger (and often louder) fans, more heavy duty heat sinks, liquid coolants, phase change cooling, or even liquid nitrogen. Second, overclocking may result in unreliable operation of the microprocessor potentially resulting in loss or corruption of data, damage to the microprocessor, or even damage to the system. This is because overclocking typically exceeds the specifications of the manufacturer, who may not have tested the microprocessor at the overclocked speeds and therefore cannot guarantee proper operation thereat. Third, overclocking the front side bus implies that the other devices that may be connected to the front side bus, such as memory, chipsets, video cards, etc., are also operating at the higher clock frequency and may also be subject to the additional cooling and unreliability problems just mentioned. Therefore, what is needed is an improved method for increasing the operating frequency of a microprocessor that avoids the drawbacks of traditional overclocking.

Still further, as mentioned herein, some microprocessors provide a means for system software, such as the BIOS or operating system, to change the operating frequency of the microprocessor. For example, the Advanced Configuration and Power Interface (ACPI) Specification, Revision 3.0 defines a P-state in terms of a CPU core operating frequency, and provides a means for system software to request the microprocessor to transition to a specified P-state. In the case of a frequency increase, typically the microprocessor must increase its operating voltage in order to support the frequency increase according to the physical characteristics of the microprocessor. The time to perform the voltage increase may be significant, depending upon the amount of voltage increase required. Conventional microprocessors increase the voltage to the necessary level and then make a single frequency change from the current frequency to the requested frequency, as shown in FIG. 4 and discussed in more detail herein. According to the conventional method of transitioning from a current P-state to a new P-state, the microprocessor operates at the lowest frequency during the entire P-state transition, which is inefficient. Therefore, what is needed is an improved method for increasing microprocessor performance when making a P-state transition.

Finally, some microprocessors include thermal monitoring and protection mechanisms. For example, various Intel® processors include Enhanced Intel SpeedStep® Technology, which includes the Thermal Monitor 2 (TM2) automatic thermal protection mechanism. TM2 was introduced in the Pentium® M processor and is also incorporated into newer models of the Pentium 4 processor family. The Intel Pentium M Processor with 2-MB L2 Cache and 533-MHz Front Side Bus Datasheet of July 2005 described TM2 as follows: "When the on-die thermal sensor indicates that the die temperature is too high, the processor can automatically perform a transition to a lower frequency/voltage specified in a software programmable MSR. The processor waits for a fixed time period. If the die temperature is down to acceptable levels, an up transition to the previous frequency/voltage point occurs." This operation is illustrated by an example with respect to FIG. 11, which is discussed in more detail herein.

The ability of the processor to operate according to the TM2 mechanism only within the two operating points, namely the default operating point and the system software-specified operating point, has drawbacks. In particular, if the gap between the two operating points is programmed to be relatively large, then for many workload level and environmental condition combinations the processor may not be operating at a performance-optimal frequency/voltage combination. On the other hand, the smaller the gap between the two operating points the less the mechanism is able to provide the desired thermal protection during heavy workloads and/or hot environmental conditions. Furthermore, a valuable performance opportunity may be lost while operating at the lower frequency/voltage point if the fixed time period is too long. Therefore, what is needed is a higher performance thermal monitoring and protection mechanism.

BRIEF SUMMARY OF INVENTION

The present invention provides an improved method for increasing microprocessor performance when making a P-state transition by, rather than making a single frequency change, iteratively making multiple frequency changes while transitioning from the current P-state voltage to the new P-state voltage.

In one aspect, the present invention provides a microprocessor. The microprocessor includes core logic, configured to operate according to a core clock signal in order to execute program instructions. The microprocessor also includes clock generation circuitry, controllable to generate the core clock signal having one of N different possible frequencies, wherein N is more than two. The microprocessor also includes a control circuit, coupled to the clock generation circuitry. The control circuit, in response to a request to operate the core logic at a destination frequency, iteratively controls the clock generation circuitry to generate the core clock signal having a new frequency on each of successive frequency iterations until the core clock signal frequency is the destination frequency. The new core clock signal frequency on each of the iterations is one of the N different possible frequencies monotonically closer to the destination frequency. The number of frequency iterations is between zero and N−1 depending upon the destination frequency specified and the core clock signal frequency when the request is received.

In another aspect, the present invention provides a method for improving the performance of a microprocessor having core logic configured operate according to a core clock signal in order to execute program instructions. The method includes receiving a request to operate the core logic at a destination frequency. The method also includes generating a new frequency on the core clock signal in response the receiving the request, the new frequency being closer to the destination frequency than a current frequency. The method also includes iterating at least twice on the generating a new frequency, until the new frequency is the destination frequency.

In another aspect, the present invention provides an apparatus for improving the performance of a microprocessor. The apparatus includes a first output, configured to provide a signal to control an operating voltage of the microprocessor. The apparatus also includes a second output, configured to provide a signal to control an operating frequency of the microprocessor. The apparatus also includes an input, configured to receive a request to operate the microprocessor at a destination frequency. The apparatus also includes a control circuit. The control circuit, in response to receiving the request on the input, iteratively generates the signal on the second output to operate the microprocessor at a plurality of different values of the operating frequency between a current frequency and the destination frequency. The control circuit also, in response to receiving the request on the input, iteratively generates the signal on the first output to operate the microprocessor at a plurality of different values of the operating voltage between a current voltage and a destination voltage associated with the destination frequency, while transitioning the operating frequency from the current frequency to the destination frequency.

In another aspect, the present invention provides a computer program product for use with a computing device, the computer program product comprising a computer usable storage medium having computer readable program code embodied in the medium, for providing a microprocessor. The computer readable program code includes first program code for providing core logic, configured to operate according to a core clock signal in order to execute program instructions. The computer readable program code also includes second program code for providing clock generation circuitry, controllable to generate the core clock signal having one of N different possible frequencies, wherein N is more than two. The computer readable program code also includes third program code for providing a control circuit, coupled to the clock generation circuitry. The control circuit, in response to a request to operate the core logic at a destination frequency, iteratively controls the clock generation circuitry to generate the core clock signal having a new frequency on each of successive frequency iterations until the core clock signal frequency is the destination frequency. The new core clock signal frequency on each said frequency iteration is one of the N different possible frequencies monotonically closer to the destination frequency. The number of frequency iterations is between zero and N−1 depending upon the destination frequency specified and the core clock signal frequency when the request is received.

In another aspect, the present invention provides a method for improving the performance of a microprocessor. The method includes receiving a request to change from operating the microprocessor at a current frequency to a destination frequency. The method also includes transitioning an operating voltage of the microprocessor from a current voltage to a destination voltage associated with the destination frequency, in response to the receiving the request. The method also includes operating the microprocessor at a plurality of frequencies between the current frequency and the destination frequency while the transitioning the operating voltage.

DETAILED DESCRIPTION OF THE INVENTION

Figure 1:
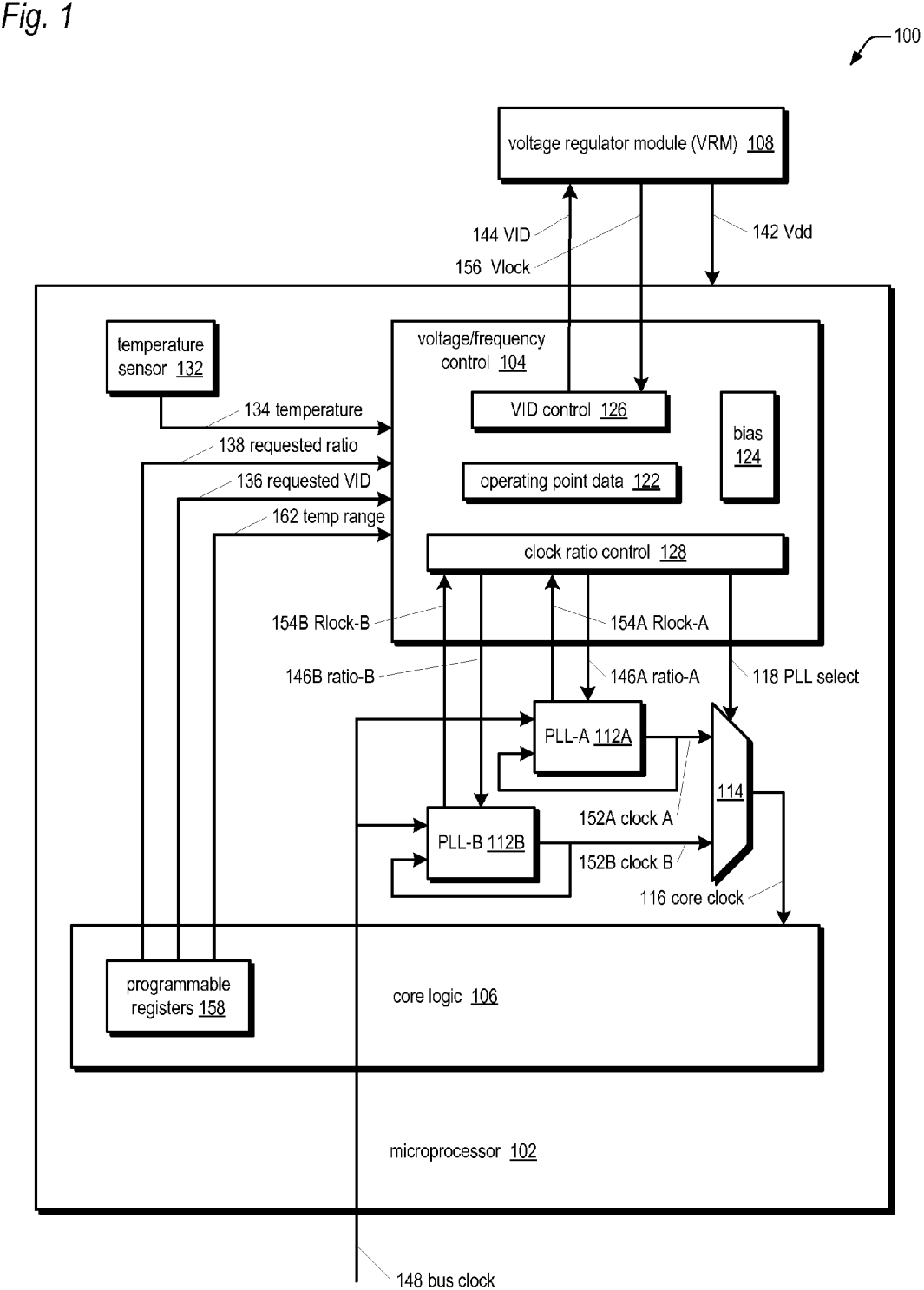
FIG. 1 is a block diagram illustrating a computing system including a microprocessor according to the present invention.

Referring now to FIG. 1, a block diagram illustrating a computing system 100 including a microprocessor 102 according to the present invention is shown. The system 100 includes a voltage regulator module (VRM) 108 coupled to the microprocessor 102. The VRM 108 includes a voltage identifier input, VID 144, received from the microprocessor 102, a Vlock output 156 provided to the microprocessor 102, and a voltage supply output, $V_{dd}$ 142, provided to the microprocessor 102. The microprocessor 102 outputs a value on the VID input 144 to control the VRM 108 to output a particular supply voltage $V_{dd}$ 142 which serves as the power source to the microprocessor 102. In response to a new value on the VID input 144, the VRM 108 gradually changes the output voltage $V_{dd}$ 142 until it reaches the requested value, at which time the VRM 108 outputs a true value on the Vlock signal 156 to indicate the $V_{dd}$ 142 value has stabilized. In one embodiment, the VRM 108 takes approximately 15 microseconds to stabilize in response to a new value on the VID input 144. In one embodiment, the VRM 108 changes the $V_{dd}$ 142 value by 16 mV for each incremental value of the VID 144.

The microprocessor 102 includes core logic 106, a temperature sensor 132, a voltage/frequency control circuit 104, two phase-locked loops (PLLs) 112A and 112B operating in parallel, and a selection circuit 114. The voltage/frequency control 104 includes a clock ratio control circuit 128, a VID control circuit 126, a bias bit 124, and storage for operating point data 122. The VID control 126 generates the VID signal 144 to the VRM 108 and receives the Vlock 156 signal from the VRM 108. The bias bit 124 indicates whether there is a preference for lower power consumption or higher performance by the microprocessor 102. In one embodiment, the bias bit 124 is programmable by system software, such as a system BIOS or the operating system.

The temperature sensor 132 senses the temperature of the microprocessor 102 and outputs the temperature 134 to the voltage/frequency control 104. In one embodiment, the temperature sensor 132 comprises multiple temperature sensors that sense the temperature of various portions of the microprocessor 102 and provide the highest temperature 134 to the voltage/frequency control 104. In one embodiment, the temperature sensor 132 is located near the portion or portions of the microprocessor 102 that are known by the manufacturer to generally operate at the highest temperature.

Each of the PLLs 112 outputs a respective clock signal 152A and 152B that are provided as inputs to the selection circuit 114. The selection circuit 114 includes a third input, PLL select 118, generated by the clock ratio control 128, which serves as a select input to the selection circuit 114. Based on the value of the PLL select 118 input, the selection circuit 114 selects one of the PLL 112 clocks 152A or 152B to output as core clock signal 116. The core clock 116 serves as the clock signal for the core logic 106. Each of the PLLs 112 receives a bus clock signal 148, which is an external clock signal received by the microprocessor 102. Preferably, the bus clock 148 is the clock signal for the external bus of the microprocessor 102, such as may be generated by a motherboard of the system 100, for example. The clock ratio control 128 also generates two ratio signals 146A and 146B that are provided to the respective PLLs 112A and 112B. The PLLs 112 generate their respective clock signals 152A and 152B that are a multiple of the bus clock 148, such as the ratios shown in FIG. 3. The PLLs 112 multiply the bus clock 148 by a factor specified by the respective ratio signal 146A and 146B. In response to a new value on the ratio input 146, the PLL 112 gradually changes the output clock frequency 152 until it reaches the requested value, at which time the PLL 112 outputs a true value on the Rlock signal 154 to indicate the clock signal 152 has locked in to the requested frequency. The output clock signals 152 are fed back as inputs to their respective PLL 112 to maintain the core clock 116 frequency synchronized with the bus clock 148 frequency according to well known operation of PLLs. In one embodiment, the PLLs 112 take approximately 10 microseconds to lock in once they receive a new value on the ratio input 146. In one embodiment, the PLLs 112 are capable of multiplying the bus clock 148 frequency by integer values from 2 to 12.

The core logic 106 performs the fetching and execution of program instructions and data. The core logic 106 may include, for example, caches, instruction fetch and issue logic, architectural and non-architectural register files, branch prediction units, address generators, result writeback logic, a bus interface unit, and execution units such as arithmetic logic units, integer units, floating point units, and SIMD units, such as are well known in the art of microprocessor design. In one embodiment, the core logic 106 comprises an x86 architecture microprocessor.

The core logic 106 may include various programmable registers, including programmable registers 158 that system software may program to request operation of the microprocessor 102 at a new operating point, operating temperature range, or other condition. An operating point is a voltage/frequency ordered pair at which the microprocessor 102 may reliably operate at a given temperature. For example, in one embodiment, the microprocessor 102 may reliably operate at an operating point of 1.0 GHz and 0.75V at 100° C. Data describing the various operating points of the processor is stored in operating point data store 122, whose use is described in more detail herein with respect to the remaining Figures. In one embodiment, the system software may program the registers 158 with a P-state value in compliance with the Advanced Configuration and Power Interface (ACPI) Specification, Revision 3.0. The ACPI specification defines a P-state in terms of a CPU core operating frequency. Although an ACPI P-state does not specify an operating voltage value, according to the ACPI specification the CPU reports a value of the typical power dissipated by the microprocessor with each supported P-state. A requested VID 136 and a requested clock ratio 138 are provided by the programmable registers 158 to the voltage/frequency control 104. The programmable registers 158 may also be programmed with an operating temperature range, which is provided to the voltage/frequency control 104 via signals 162, and which is described in more detail herein with respect to FIGS. 9 and 10. The VID control 126 and the clock ratio control 128 generate the VID 144, ratio 146, and PLL select 118 signal values, among other things, in response to the requested VID 136 and requested clock ratio 138 values and in response to the temperature range 162 values, as described in more detail herein.

Figure 13:
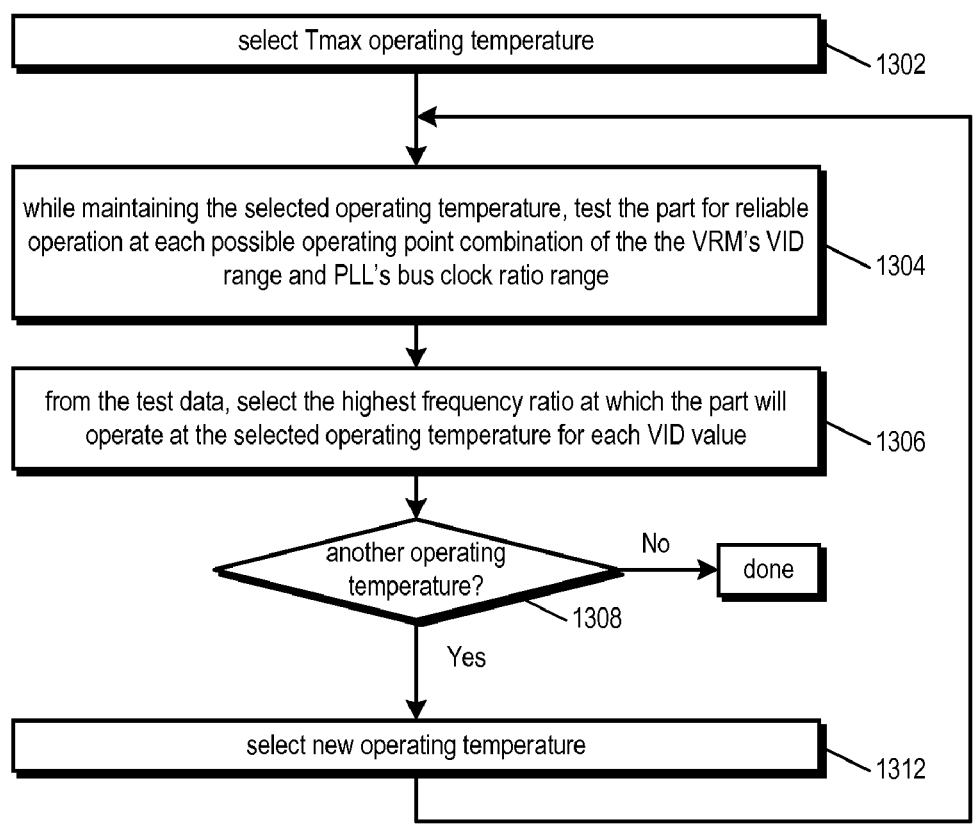
FIG. 13 is a flowchart illustrating a process for creating operating point information included in the operating point data of the microprocessor of FIG. 1 according to an embodiment of the present invention.

The operating point data 122 includes information specifying, for each of multiple operating temperatures, multiple operating points (i.e., voltage/frequency combinations) at which the microprocessor 102 may reliably operate at the given one of the multiple operating temperatures. FIG. 13 describes the process by which the operating point data 122 is determined according to one embodiment. In one embodiment, the operating point data 122 includes a table of operating points for each of the multiple operating temperatures. Each entry in the table comprises the maximum PLL 112 frequency ratio value at which the microprocessor 102 may reliably operate at a given VID 144 value at the specified one of the multiple operating temperatures. In one embodiment, the table includes, for each of the operating temperatures, a frequency ratio for each of the possible $V_{dd}$ 142 values the VRM 108 is capable of outputting. In another embodiment, the operating point data 122 includes a frequency ratio for fewer than all the possible $V_{dd}$ 142 values, and the microprocessor 102 calculates the frequency ratio value for the remaining possible $V_{dd}$ 142 values using the included values. In one embodiment, the microprocessor 102 calculates the frequency ratio value for the remaining possible $V_{dd}$ 142 values by extrapolating along a line between two endpoints of the line at the maximum and minimum $V_{dd}$ 142 values. In another embodiment, the microprocessor 102 calculates the frequency ratio value for the remaining possible $V_{dd}$ 142 values according to a predetermined polynomial expression stored within the microprocessor 102.

In one embodiment, the manufacturer stores the operating point data 122 in the microprocessor 102 during its fabrication, such as in hard-wired logic of the microprocessor 102. Additionally or alternatively, the operating point information is programmed into programmable fuses, programmable logic, or a non-volatile memory of the microprocessor 102 after fabrication of the microprocessor 102, such as during manufacturing configuration of the microprocessor 102 after testing of each microprocessor 102 part, or by system software during operation of the microprocessor 102.

Figure 2:
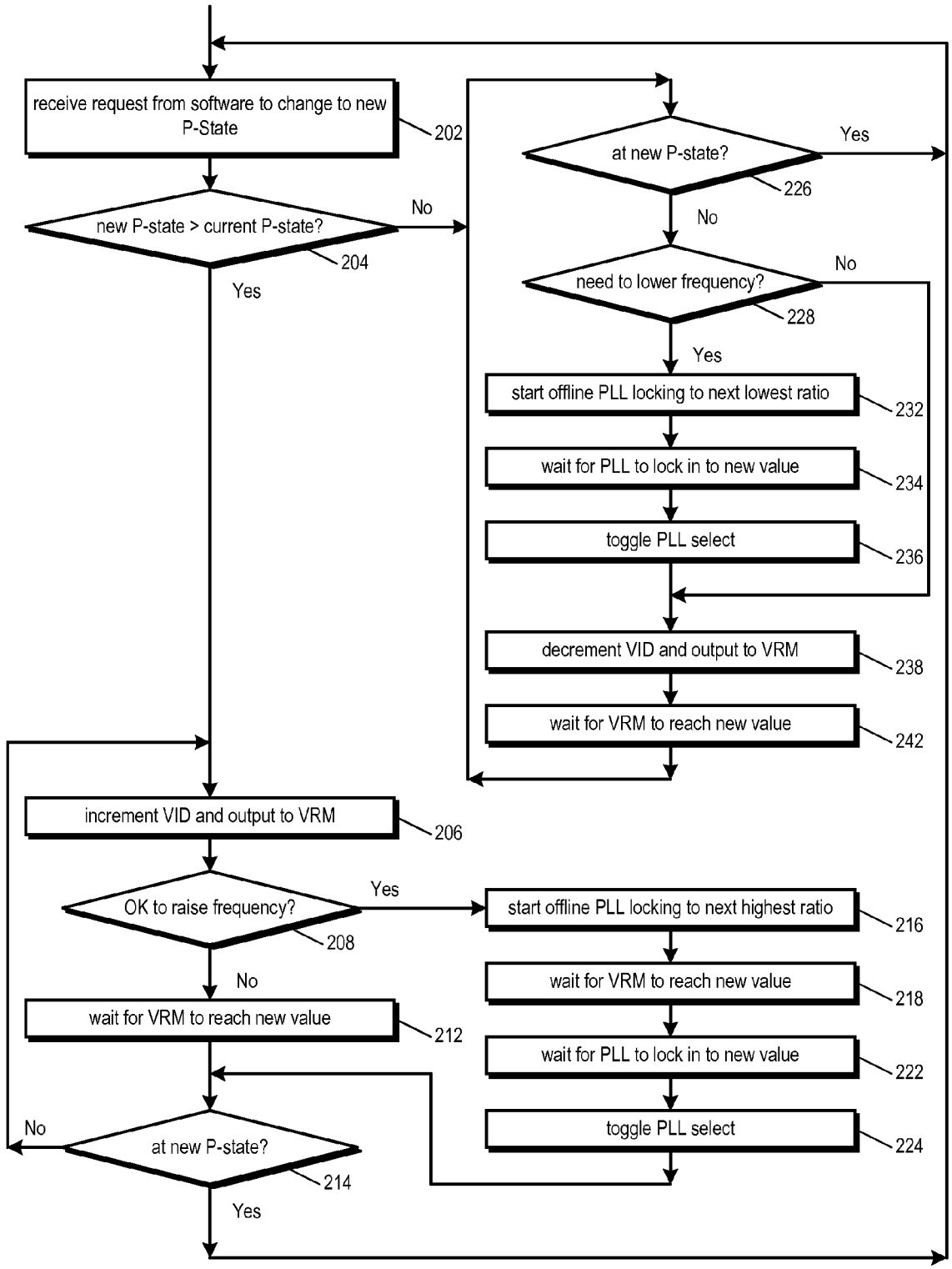
FIG. 2 is a flowchart illustrating operation of the microprocessor of FIG. 1 to transition from a current P-state, or operating point, to a new P-state, or operating point, in a performance-optimizing manner according to the present invention.

Referring now to FIG. 2, a flowchart illustrating operation of the microprocessor 102 of FIG. 1 to transition from a current P-state, or operating point, to a new P-state, or operating point, in a performance-optimizing manner according to the present invention is shown. Flow begins at block 202.

At block 202, the microprocessor 102 receives a request from system software to change from the current P-state to a new P-state. In one embodiment, system software programs the registers 158 of FIG. 1 with a new value to request the change to the new P-state. In response, the requested VID 136 and requested core clock ratio 138 are provided to the voltage/frequency control 104 of FIG. 1. In one embodiment, only the requested core clock ratio 138 is provided to the voltage/frequency control 104, and the new $V_{dd}$ 142 value is determined from the operating point data 122. In one embodiment, the voltage/frequency control 104 accesses the operating point information for a predetermined temperature, such as the maximum operating temperature, to determine the minimum $V_{dd}$ 142 value at which the microprocessor 102 may reliably operate at the requested ratio 138. Flow proceeds to decision block 204.

At decision block 204, the voltage/frequency control 104 of FIG. 1 determines whether the operating frequency specified by the new P-state requested at block 202 is greater than the current operating frequency. If not, flow proceeds to block 226; otherwise, flow proceeds to block 206.

At block 206, the VID control 126 increments the VID 144 to cause the VRM 108 to begin raising the $V_{dd}$ 142 value. That is, the VID control 126 outputs a new value on the VID 144 that is one greater than the current value. Preferably, the VRM 108 is capable of increasing the $V_{dd}$ 142 to the new level in a steady manner such that the microprocessor 102 may continue to operate during the $V_{dd}$ 142 output transition. That is, operation of the microprocessor 102 need not be suspended while the VRM 108 is changing the $V_{dd}$ 142. Flow proceeds to decision block 208.

At decision block 208, the voltage/frequency control 104 determines from the operating point data 122 associated with the $T_{max}$ operating temperature whether it is permissible to raise the operating core clock 116 frequency based on the fact that the operating voltage $V_{dd}$ 142 is being raised to the next highest VID 144. If so, flow proceeds to block 216; otherwise, flow proceeds to block 212.

At block 212, the VID control 126 waits for the Vlock signal 156 to indicate that the $V_{dd}$ 142 has reached the new value requested at block 206. Flow proceeds to decision block 214.

At decision block 214, the voltage/frequency control 104 determines whether the new P-state requested at block 202 has been reached. If not, flow proceeds to block 206 to continue increasing the voltage $V_{dd}$ 142 and, as necessary, the core clock frequency 116 until reaching the P-state requested at block 202; otherwise, flow proceeds to block 202 to await another P-state change request.

At block 216, the clock ratio control 128 outputs a new value on the ratio control signal 146 of the offline PLL 112 to start the offline PLL 112 locking in to the next highest ratio of the bus clock 148 than the current core clock frequency 116 that is supported by the soon-to-be new $V_{dd}$ 142 value corresponding to the VID 144 value output at block 206. Typically, the new value on the ratio control signal 146 of the offline PLL 112 will be one greater than the current value of the ratio control signal 146 of the online PLL 112; however, if the slope of the operating point curve is relatively steep, then the new ratio may be two or more ratios above the current ratio. If the output 152A of PLL-A 112A is currently selected by the selection circuit 114 to be the core clock 116 output, then PLL-A 112A is the online PLL 112 and PLL-B 112B is the offline PLL 112, and vice versa. Flow proceeds to block 218.

At block 218, the VID control 126 waits for the Vlock signal 156 to indicate that the $V_{dd}$ 142 has reached the new value requested at block 206. Flow proceeds to decision block 222.

At block 222, the ratio control 146 waits for the Rlock signal 154 of the offline PLL 112 to indicate that its output clock signal 152 has locked in on the new frequency requested at block 216. Flow proceeds to block 224.

At block 224, the ratio control 146 toggles the value on the PLL select signal 118 to select the offline PLL 112 clock output 152 as the core clock 116, thus making the offline PLL 112 now the online PLL 112 and the online PLL 112 the offline PLL 112. When the clock ratio of a PLL is being changed, the output of the PLL 112 cannot be used until the PLL has locked in to the new frequency. Advantageously, because the microprocessor 102 includes two PLLs 112A and 112B that can be alternated between being the online PLL 112 and the offline PLL 112, the core clock frequency 116 can be changed effectively instantaneously, as described herein, and as described in U.S. patent application Ser. No. 10/816,004 (CNTR.2216), filed Apr. 1, 2004. In one embodiment, the core clock frequency 116 may be changed within a single cycle of the bus clock 148. In one embodiment, the core clock frequency 116 may not be changed during certain phases of an active transaction on the processor bus; thus, the clock ratio control 128 makes an additional check and waits until the bus transaction phase completes before toggling the PLL select signal 118. In the embodiment of FIG. 2, performing steps 206 through 224 achieves proper operation of the microprocessor 102 because the VID 144 increments are relatively small, such as on the order of 16 mV. However, other embodiments are contemplated in which the VID 144 increments are relatively large, in which case the order of steps 216 and 218 are reversed to allow the VRM 108 to stabilize first before starting the offline PLL 112 locking to the next higher ratio. Flow proceeds to decision block 214.

At decision block 226, the voltage/frequency control 104 determines whether the new P-state requested at block 202 has been reached. If so, flow proceeds to block 202 to await another P-state change request; otherwise, flow proceeds to decision block 228.

At decision block 228, the voltage/frequency control 104 determines from the operating point data 122 associated with the $T_{max}$ operating temperature whether the operating core clock 116 frequency needs to be lowered based on the fact that the operating voltage $V_{dd}$ 142 is about to be lowered to the next lowest VID 144. If not, flow proceeds to block 238; otherwise, flow proceeds to block 232.

At block 232, the clock ratio control 128 outputs a new value on the ratio control signal 146 of the offline PLL 112 to start the offline PLL 112 locking in to the next lowest ratio of the bus clock 148 than the current core clock frequency 116 that is required by the soon-to-be new $V_{dd}$ 142 value corresponding to the VID 144 value that will be output at block 238. Typically, the new value on the ratio control signal 146 of the offline PLL 112 will be one less than the current value of the ratio control signal 146 of the online PLL 112; however, if the slope of the operating point curve is relatively steep, then the new ratio may be two or more ratios below the current ratio. Flow proceeds to block 234.

At block 234, the ratio control 146 waits for the Rlock signal 154 of the offline PLL 112 to indicate that its output clock signal 152 has locked in on the new frequency requested at block 232. In one embodiment, when waiting to receive a request to change to a new P-state at block 202 the offline PLL 112 is pre-locked in to the next lowest ratio. This is an optimization because when transitioning to a higher P-state, the voltage/frequency control 104 must wait a period for the VRM 108 to complete increasing the $V_{dd}$ 142 which is greater than the period required to lock in the offline PLL 112 to the next highest ratio; whereas, when transitioning to a lower P-state, the voltage/frequency control 104 can immediately reduce the ratio without waiting for the VRM 108 to complete lowering the $V_{dd}$ 142. Flow proceeds to block 236.

At block 236, the ratio control 146 toggles the value on the PLL select signal 118 to select the offline PLL 112 clock output 152 as the core clock 116, thus making the offline PLL 112 now the online PLL 112 and the online PLL 112 the offline PLL 112. Flow proceeds to block 238.

At block 238, the VID control 126 decrements the VID 144 to cause the VRM 108 to begin lowering the $V_{dd}$ 142 value. That is, the VID control 126 outputs a new value on the VID 144 that is one less than the current value. Preferably, the VRM 108 is capable of decreasing the $V_{dd}$ 142 to the new level in a steady manner such that the microprocessor 102 may continue to operate during the $V_{dd}$ 142 output transition. Flow proceeds to block 242.

At block 242, the VID control 126 waits for the Vlock signal 156 to indicate that the $V_{dd}$ 142 has reached the new value requested at block 238. Flow proceeds to decision block 226.

Figure 3:
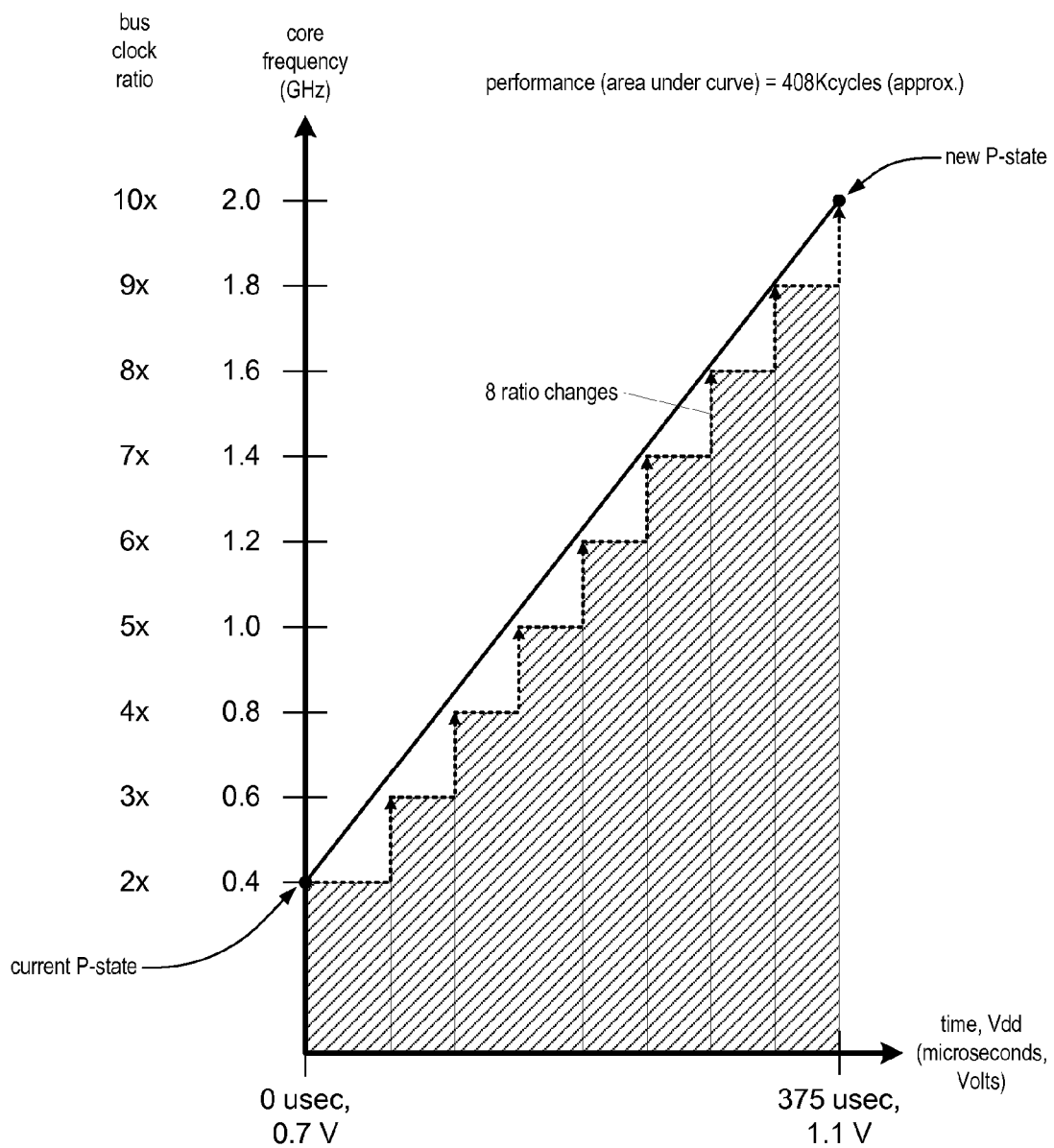
FIG. 3 is a graph further illustrating, by an example, operation of the microprocessor of FIG. 1 making a P-state transition according to the embodiment of FIG. 2.

Referring now to FIG. 3, a graph further illustrating, by an example, operation of the microprocessor 102 of FIG. 1 making a P-state transition according to the embodiment of FIG. 2 is shown. The independent variables on the horizontal axis of the graph are time measured in microseconds and the operating voltage $V_{dd}$ 142 measured in Volts. The domain of the time is 0 to 375 microseconds, which represents 25 VID 144 increments of the $V_{dd}$ 142 value and corresponds to the domain of $V_{dd}$ 142 from 0.7 V to 1.1 V, where each of the 25 $V_{dd}$ 142 increments is 16 mV. The dependent variable on the vertical axis of the graph is the core clock frequency 116 measured in GHz. In the embodiment of FIG. 3, the bus clock frequency is 200 MHz, the range of bus clock ratios is 2× to 10×, resulting in a corresponding core clock frequency 116 range of 400 MHz to 2.0 GHz. The graph shows a transition according to FIG. 2 from a lowest P-state at 400 MHz (2× ratio) and corresponding 0.7 V $V_{dd}$ 142 value to the highest P-state at 2.0 GHz (10× ratio) and corresponding 1.1 V $V_{dd}$ 142 value. The performance during the 375 microsecond transition period is the number of core clock 116 cycles, which is the area of the rectangles under the curve between the lowest and highest P-states, which in the example of FIG. 3 is a line between the lowest and highest P-states. As the time and $V_{dd}$ 142 values increase, a new rectangle is formed each time the core clock 116 frequency is increased. In the example of FIG. 3, employing the steps of FIG. 2, the performance is approximately 408,000 core clock 116 cycles.

FIG. 3 illustrates a transition from one P-state to a higher P-state using the iterative approach of FIG. 2 to optimize performance during the transition. As described in FIG. 2, the iterative approach may also be used to make a transition from one P-state to a lower P-state to optimize performance during the transition. However, in an alternate embodiment, when transitioning to a lower P-state, operation is optimized for reduced power, viz, the transition is made by immediately reducing the operating frequency to the low P-state and remaining at the low P-state frequency while the voltage value is transitioned to the specified voltage value.

Figure 4:
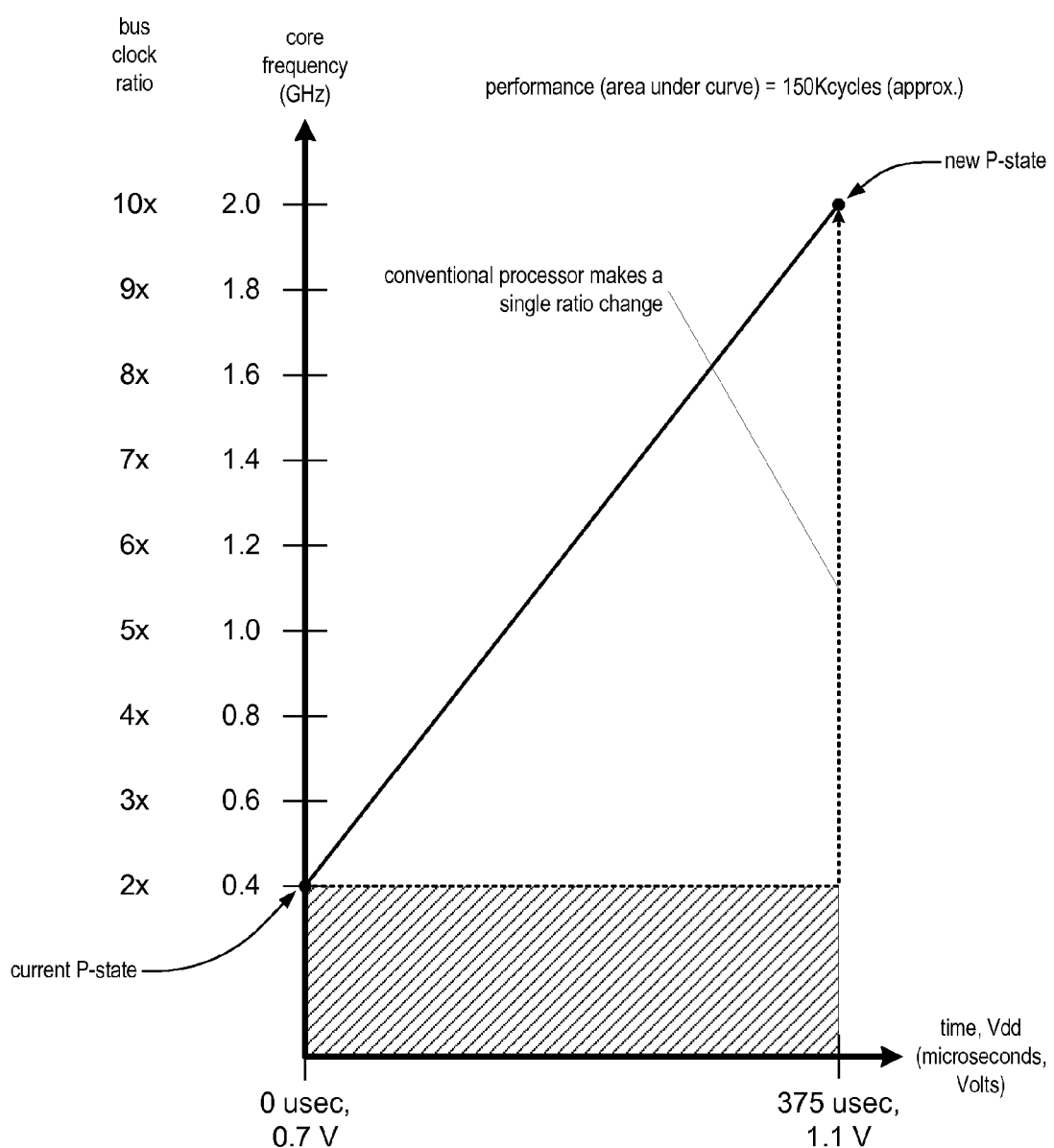
FIG. 4 is a graph illustrating, by an example, operation of a conventional microprocessor making a P-state transition.

Referring now to FIG. 4, a graph illustrating, by an example, operation of a conventional microprocessor making a P-state transition is shown. The graph of FIG. 4 is similar to the graph of FIG. 3, except that the microprocessor continues to operate at the 400 MHz (2× ratio) frequency throughout the transition of the supply voltage value up to the highest P-state value of 1.1 V, at which time a single change of the core clock frequency to 2.0 GHz (10× ratio) is made. Accordingly, in the example of FIG. 4, the performance is only approximately 150,000 core clock cycles.

As may be observed from FIGS. 3 and 4, the amount of time required to transition from a current P-state to another P-state (or vice versa) may be relatively large, on the order of hundreds of microseconds. The microprocessor 102 of FIG. 1 operating according to the embodiment of FIG. 2 has the advantage that it does not require any stopping of the core clock 116 to the core logic 106 to make the P-state transition by virtue of the dual PLL 112 arrangement, which facilitates effectively instantaneous core clock 116 frequency changes. That is, the voltage/frequency control 104 advantageously makes the multiple intermediate operating point transitions without suspending operation of the core logic 106 from executing program instructions. This is in contrast to conventional microprocessors which must incur at least the delay of waiting for their single PLL 112 to lock in to the new frequency (for example, approximately 10 microseconds). Additionally, as may be observed by comparing FIGS. 3 and 4, the core logic 106 of the microprocessor 102 operating according to the embodiment of FIG. 2 has the advantage that it enjoys almost three times the number of clock cycles for execution of instructions than the conventional method during the P-state transition time, which may potentially be hundreds of microseconds. These two additional performance advantages may be significant, particularly in environments in which the operating system is requesting relatively frequent P-state changes due to rapidly varying temperature conditions.

It is noted that while according to steps 206 through 224 or 228 through 242 of FIG. 2, with some VID 144 increments or decrements, the voltage/frequency control 104 may not perform a corresponding ratio increase or decrease, and vice versa. This depends upon the single VID 144 change amount (e.g., 16 mV), upon the frequency amount of a single ratio change (e.g., 200 MHz), and upon the valid operating point values stored in the operating point data 122 or calculated from the operating point data 122. Thus, for example, assume the microprocessor 102 is currently operating at 1.2 GHz (6× ratio) and 0.9 V while transitioning to a higher P-state. The voltage/frequency control 104 will perform step 206 to increase the $V_{dd}$ 142 to 0.916 V. If the operating point data 122 indicates that at 0.916 V the microprocessor 102 can reliably operate at 1.2 GHz (6× ratio), but not at 1.4 GHz (7× ratio), then the voltage/frequency control 104 foregoes performing steps 216 through 224 and continues operating at 1.2 GHz until the $V_{dd}$ 142 reaches a value at which the operating point data 122 indicates the microprocessor 102 may reliably operate at 1.4 GHz, in which case the voltage/frequency control 104 will perform steps 216 through 224 during that iteration of the loop. In the example of FIG. 3, the voltage/frequency control 104 performs twenty-five VID 144 changes and eight core clock 116 ratio changes; thus, approximately every three VID 144 changes the voltage/frequency control 104 will perform a core clock 116 ratio change.

In the example of FIG. 3, a single maximum operating temperature curve is assumed. However, as discussed herein with respect to the remaining Figures, the steps of FIG. 2 may be advantageously employed in the embodiments of FIGS. 5 through 10, 12, and 14 to make operating point transitions that involve multiple operating temperatures.

Figure 5:
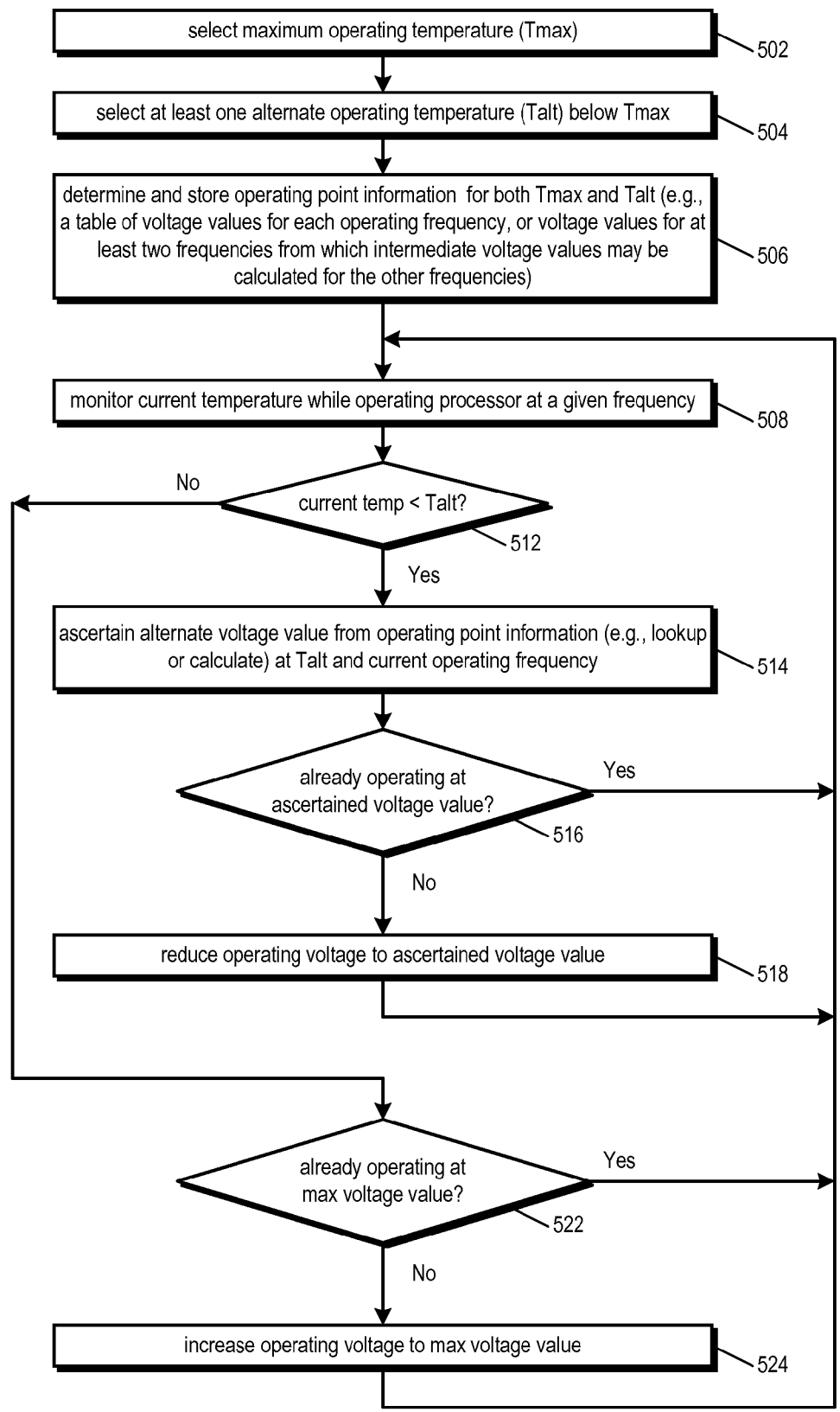
FIG. 5 is a flowchart illustrating operation of the microprocessor of FIG. 1 to reduce the operating voltage when the operating temperature of the microprocessor is below a temperature threshold in order to save power according to the present invention.

Referring now to FIG. 5, a flowchart illustrating operation of the microprocessor 102 of FIG. 1 to reduce the operating voltage when the operating temperature of the microprocessor 102 is below a temperature threshold in order to save power according to the present invention is shown. Flow begins at block 502.

At block 502, the microprocessor 102 manufacturer selects the maximum operating temperature at which the user may operate the microprocessor 102, referred to as $T_{max}$, and includes the $T_{max}$ value in the operating point data 122. The maximum operating temperature may be determined based on device technology and customer requirements, among other factors, as well as expected typical cooling systems provided by computer system manufacturers. In one embodiment, the maximum operating temperature selected is 100° C., although other values may be chosen. In one embodiment, the manufacturer selects the $T_{max}$ value based on market requirements. In one embodiment, the manufacturer selects the $T_{max}$ value as the temperature at which the user may reliably operate the microprocessor 102 at $T_{max}$ for a lifetime over which the manufacturer wishes to guarantee to consumers proper operation of the microprocessor 102. In one embodiment, the manufacturer provides a 10 year guarantee of the parts, although other values may be chosen. In one embodiment, the manufacturer determines the $T_{max}$ value based on accelerated life testing of the microprocessor 102. In one embodiment, the $T_{max}$ value is programmed into a programmable fuse of the microprocessor 102. Flow proceeds to block 504.

At block 504, the microprocessor 102 manufacturer selects at least one alternate operating temperature of the microprocessor 102, referred to as $T_{alt}$, which is less than the $T_{max}$ value, and includes the $T_{alt}$ value in the operating point data 122. In one embodiment, the microprocessor 102 manufacturer may select multiple $T_{alt}$ values for which to determine operating point information as described herein with respect to block 506, as described herein with respect to FIGS. 14 and 15. In one embodiment, the microprocessor 102 operates with a default $T_{alt}$ value that system software may override by programming another $T_{alt}$ value into a register used by the voltage/frequency control 104. In one embodiment, the default $T_{alt}$ value is programmed into a programmable fuse of the microprocessor 102. Flow proceeds to block 506.

At block 506, the microprocessor 102 manufacturer determines the operating point information for each of the $T_{max}$ and $T_{alt}$ values. According to one embodiment, the operating point information for the $T_{max}$ and $T_{alt}$ values is determined according to the embodiment of FIG. 13. Flow proceeds to block 508.

At block 508, the microprocessor 102 monitors its temperature while operating at a given frequency. That is, the temperature sensor 132 senses the current operating temperature and provides the temperature 134 to the voltage/frequency control 104 of FIG. 1. In one embodiment, the given operating frequency is a default value, which may be a single operating frequency at which the microprocessor 102 is enabled to operate. In one embodiment, system software instructs the microprocessor 102 to operate at the given operating frequency. The system software may be the system BIOS or operating system, for example. In one embodiment, the system software instructs the microprocessor 102 to operate at the given operating frequency by programming a performance state (P-state) value into the microprocessor 102. In one embodiment, the P-state value conforms to the Advanced Configuration and Power Interface (ACPI) Specification, such as Revision 3.0 of the ACPI Specification. Flow proceeds to decision block 512.

At decision block 512, the voltage/frequency control 104 determines whether the current temperature 134 is less than the $T_{alt}$ value. The current operating temperature 134 may drop below the $T_{alt}$ value for various reasons, such as a reduction in the workload placed upon the microprocessor 102 by the programs executing thereon or changes in the operating environment such as an air conditioning unit in the machine room turning on or the removal of an obstruction to airflow around the microprocessor 102. Advantageously, as shown in FIG. 5, the voltage/frequency control 104 may take advantage of the drop in the temperature 134 by reducing the operating voltage $V_{dd}$ 142 to reduce the power consumed by the microprocessor 102. Furthermore, because the microprocessor 102 is more likely to be consuming less power while operating at the lower voltage, its operating temperature 134 will likely remain below the $T_{alt}$ value, thus advantageously prolonging operation at the lower voltage and the commensurate power savings. If the current temperature 134 is not less than the $T_{alt}$ value, flow proceeds to decision block 522; otherwise, flow proceeds to block 514.

At block 514, the voltage/frequency control 104 determines from the operating point information 122 the voltage value specified for operating the microprocessor 102 at the current operating frequency at the $T_{alt}$ value. As discussed herein, the voltage/frequency control 104 may look up the voltage value in a table, or may calculate the voltage value based on operating point values stored in the operating point information 122. Flow proceeds to decision block 516.

At decision block 516, the voltage/frequency control 104 determines whether the microprocessor 102 is currently operating at the voltage value determined at block 514. If so, flow returns to block 508; otherwise, flow proceeds to block 518.

At block 518, the voltage/frequency control 104 reduces the operating voltage to the value determined at block 514, namely by outputting the appropriate VID value 144 to the VRM 108 of FIG. 1, which responsively provides the reduced value of $V_{dd}$ 142 to the microprocessor 102. In one embodiment, the voltage/frequency control 104 reduces the operating voltage $V_{dd}$ 142 in relatively small increments, such as 16 mV, until it reaches the value determined at block 514. Flow returns to block 508.

At decision block 522, the voltage/frequency control 104 determines whether the microprocessor 102 is currently operating at the maximum voltage value for the current operating frequency, i.e., the voltage value for the current operating frequency at the $T_{max}$ value. If so, flow returns to block 508; otherwise, flow proceeds to block 524.

At block 524, the voltage/frequency control 104 increases the operating voltage to the maximum voltage value. In one embodiment, the voltage/frequency control 104 increases the operating voltage $V_{dd}$ 142 in relatively small increments, such as 16 mV, until it reaches the maximum voltage value. Flow returns to block 508.

Figure 14:
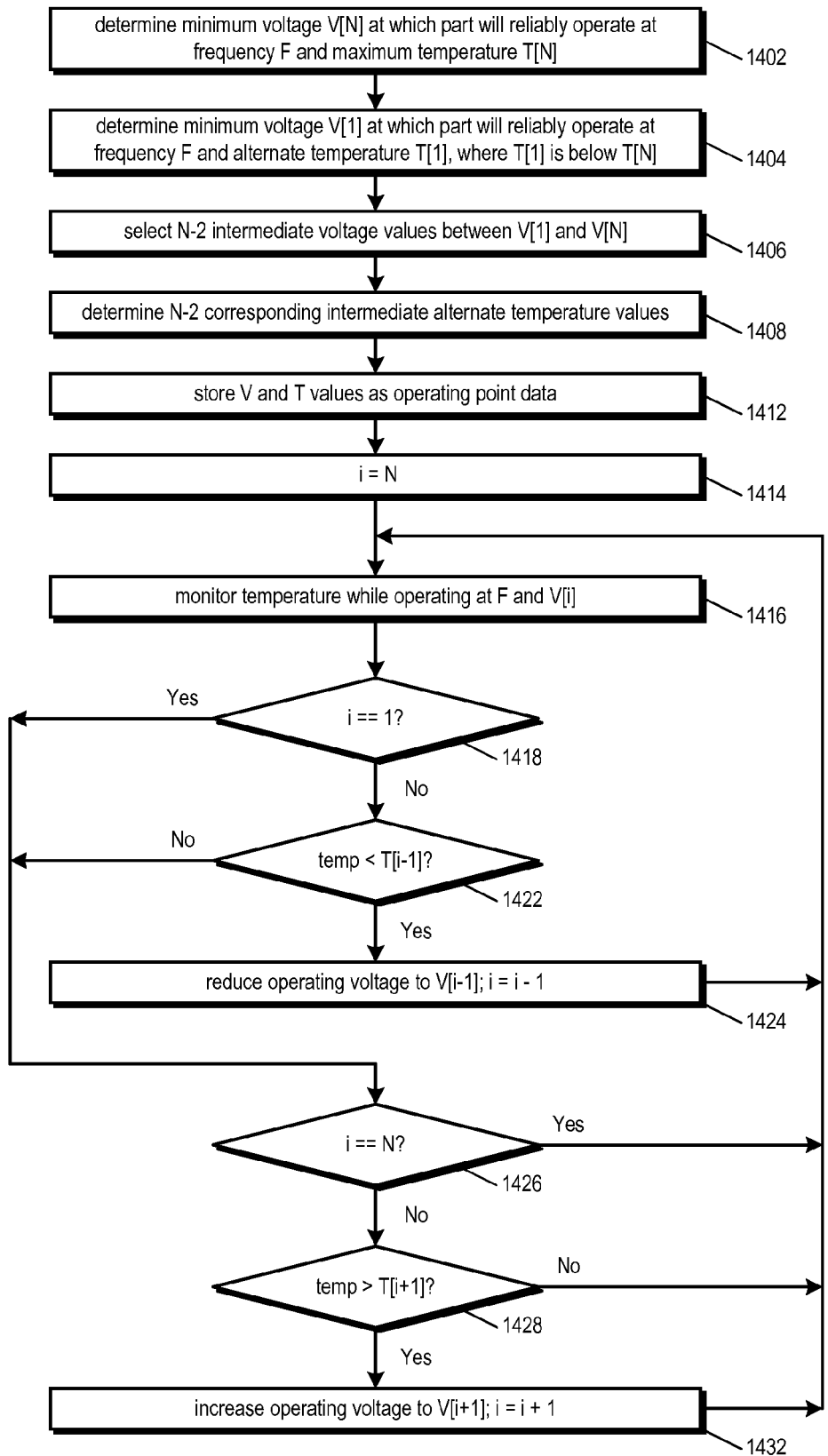
FIG. 14 is a flowchart illustrating operation of the microprocessor 102 of FIG. 1 to successively reduce the operating voltage when the operating temperature of the microprocessor 102 is below corresponding successively lower temperature thresholds in order to save power according to an alternate embodiment.
Figure 15:
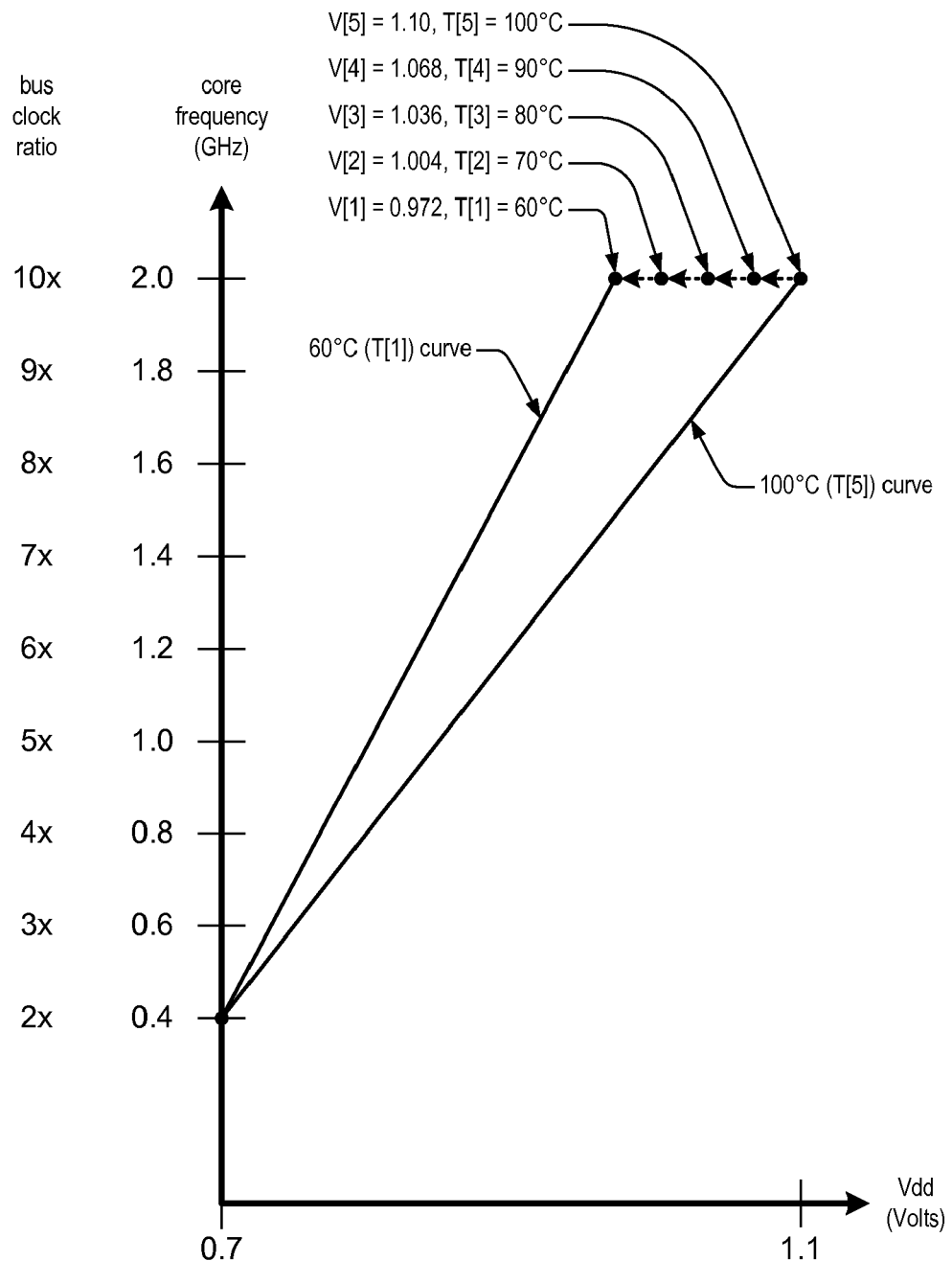
FIG. 15 is a graph further illustrating operation of the microprocessor 102 as described with respect to the embodiment of FIG. 14.

In an alternate embodiment described herein with respect to FIGS. 14 and 15, the microprocessor 102 manufacturer determines multiple alternate temperatures and determines and stores operating point information for multiple alternate temperatures, rather than just a single alternate temperature. In this embodiment, the microprocessor 102 may advantageously transition operation between the voltages associated with the maximum and multiple alternate temperatures as the temperature varies according to workload and environmental conditions, thereby operating the microprocessor 102 at the lowest power consumption level for the required frequency/performance level, which may be specified by the operating system or other system software, for example.

Figure 6:
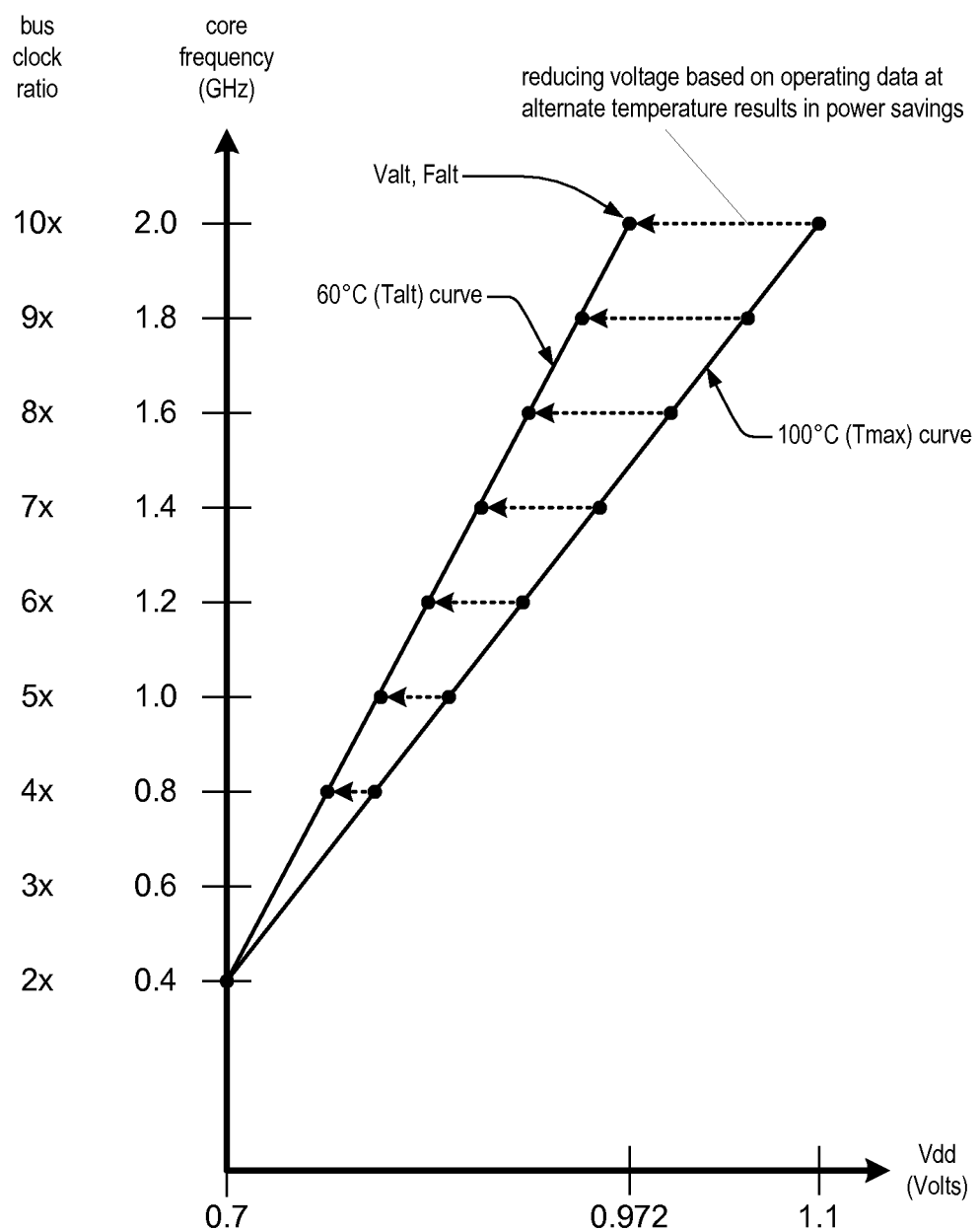
FIG. 6 is a graph further illustrating operation of the microprocessor as described with respect to the embodiment of FIG. 5.

Referring now to FIG. 6, a graph further illustrating operation of the microprocessor 102 as described with respect to the embodiment of FIG. 5 is shown. The independent variable of the graph is the operating voltage $V_{dd}$ 142 on the horizontal axis measured in Volts. The dependent variable of the graph is the core clock frequency 116 on the vertical axis measured in GHz. In the embodiment of FIG. 6, the bus clock frequency is 200 MHz, the range of bus clock ratios is 2× to 10×, resulting in a core clock frequency 116 range of 400 MHz (2× ratio) to 2.0 GHz (10× ratio). The graph shows two voltage/frequency curves, one for the $T_{max}$ value (which is 100° C. in the embodiment) and one for the $T_{alt}$ value (which is 60° C. in the embodiment). In the embodiment of FIG. 6, an operating point of 1.1 V is shown for the 2.0 GHz operating frequency at the $T_{max}$ value and an operating point of 0.972 V is shown for the 2.0 GHz frequency at the $T_{alt}$ value. Thus, for example, according to FIG. 6, if while operating at 2.0 GHz the voltage/frequency control 104 determines that the temperature 134 has dropped below 60° C., the voltage/frequency control 104 may reduce the $V_{dd}$ 142 value from 1.1 V to 0.972 V. As shown in the graph, the operating voltage $V_{dd}$ 142 may be reduced to a lower value at each of the core clock frequency 116 values if the operating temperature 134 is below the $T_{alt}$ value, thereby advantageously resulting in lower power consumption by the microprocessor 102 than when operating at the maximum voltage $V_{dd}$ 142 at the core clock frequency 116.

As may be observed from FIGS. 5 and 6, the embodiments may reduce the amount of power consumed by the microprocessor 102 at a given required performance level. The following example provides further illustration. Assume the system 100 is being used only to watch a DVD and the operating system responsively determines that a relatively low level of performance is required and power savings may be achieved. Consequently, the operating system programs the microprocessor 102 to operate at a 1.2 GHz clock frequency, for example. Assume the operating temperature 134 of the microprocessor 102 drops below the $T_{alt}$ value of 60° C. In this case, according to FIGS. 5 and 6, the voltage/frequency control 104 reduces the operating voltage $V_{dd}$ 142 to a lower value to further reduce the microprocessor 102 power consumption.

Another advantage of the embodiment of FIGS. 5 and 6 is that it not only potentially reduces the dynamic power consumption of the microprocessor 102, but it also potentially reduces the static power consumption of the microprocessor 102. The static power consumption is primarily attributed to the amount of leakage power consumed by a transistor even when not making a transition. The leakage power is directly proportional to the operating voltage value. Thus, by reducing the operating voltage $V_{dd}$ 142 according to FIGS. 5 and 6, the static power consumption may also be advantageously reduced. Thus, advantageously, even a relatively small reduction in the $V_{dd}$ 142 value may result in significant power reduction.

Figure 7:
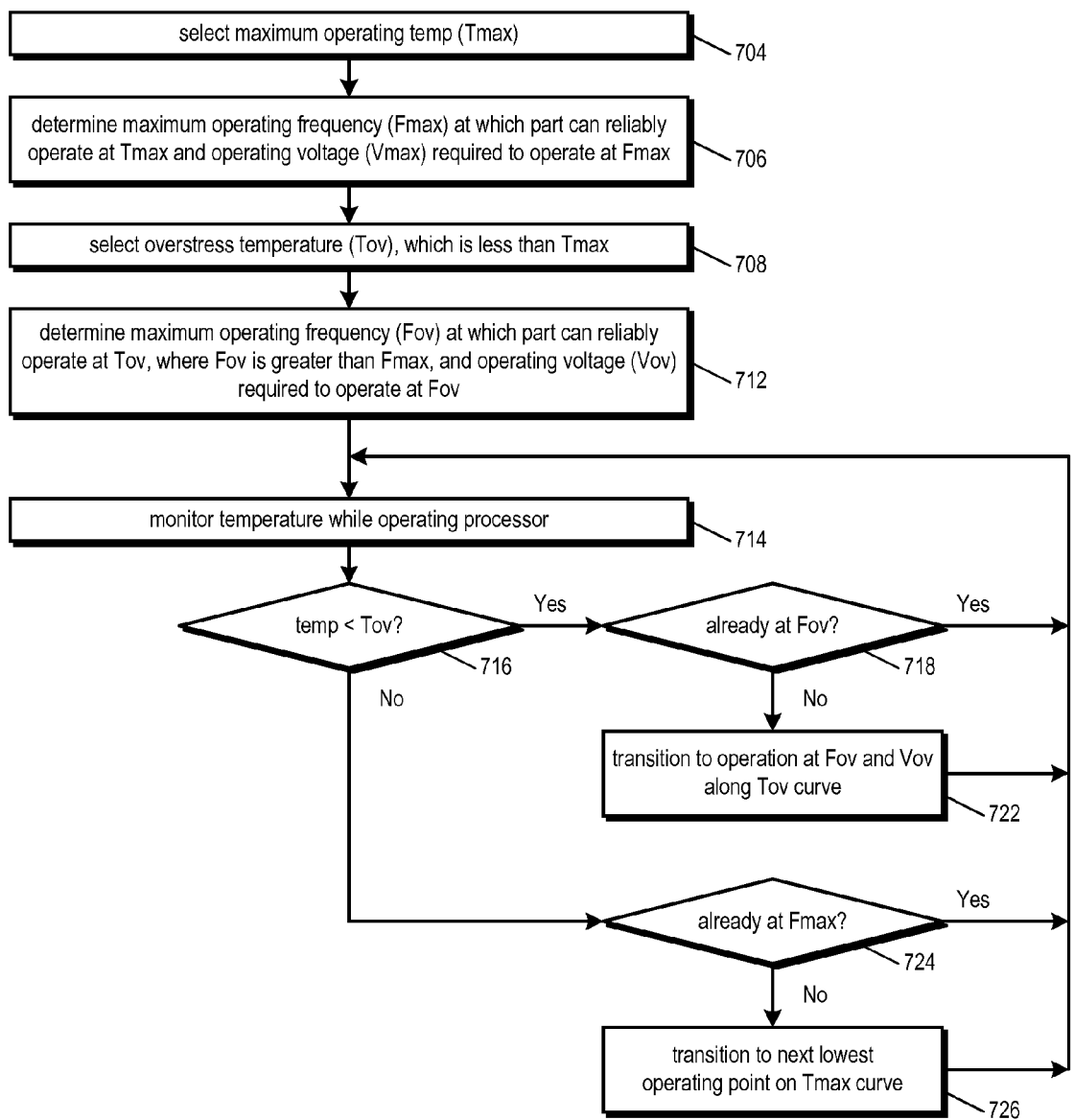
FIG. 7 is a flowchart illustrating operation of the microprocessor of FIG. 1 to increase the performance of the microprocessor when the operating temperature of the microprocessor is below a temperature threshold according to the present invention.

Referring now to FIG. 7, a flowchart illustrating operation of the microprocessor 102 of FIG. 1 to increase the performance of the microprocessor when the operating temperature of the microprocessor 102 is below a temperature threshold according to the present invention is shown. The method illustrated in FIG. 7 is referred to herein as "overstress" or "overstress mode" to distinguish it from traditional overclocking, which does not include the microprocessor 102 monitoring its own operating temperature and automatically dynamically varying the operating frequency ratio between a maximum ratio and an overstress ratio based on the operating temperature, as described herein. Flow begins at block 704.

At block 704, the manufacturer selects the maximum operating temperature at which the user may operate the microprocessor 102, referred to as $T_{max}$, and includes the $T_{max}$ value in the operating point data 122. The maximum operating temperature may be determined based on device technology and customer requirements, among other factors, as well as expected typical cooling systems provided by computer system manufacturers. In one embodiment, the maximum operating temperature selected is 100° C., although other values may be chosen. In one embodiment, the manufacturer selects the $T_{max}$ value based on market requirements. In one embodiment, the manufacturer selects the $T_{max}$ value as the temperature at which the user may reliably operate the microprocessor 102 at $T_{max}$ for a lifetime over which the manufacturer wishes to guarantee to consumers proper operation of the microprocessor 102. In one embodiment, the manufacturer provides a 10 year guarantee of the parts, although other values may be chosen. In one embodiment, the manufacturer determines the $T_{max}$ value based on accelerated life testing of the microprocessor 102. In one embodiment, the $T_{max}$ value is programmed into a programmable fuse of the microprocessor 102. Flow proceeds to block 706.

Figure 8:
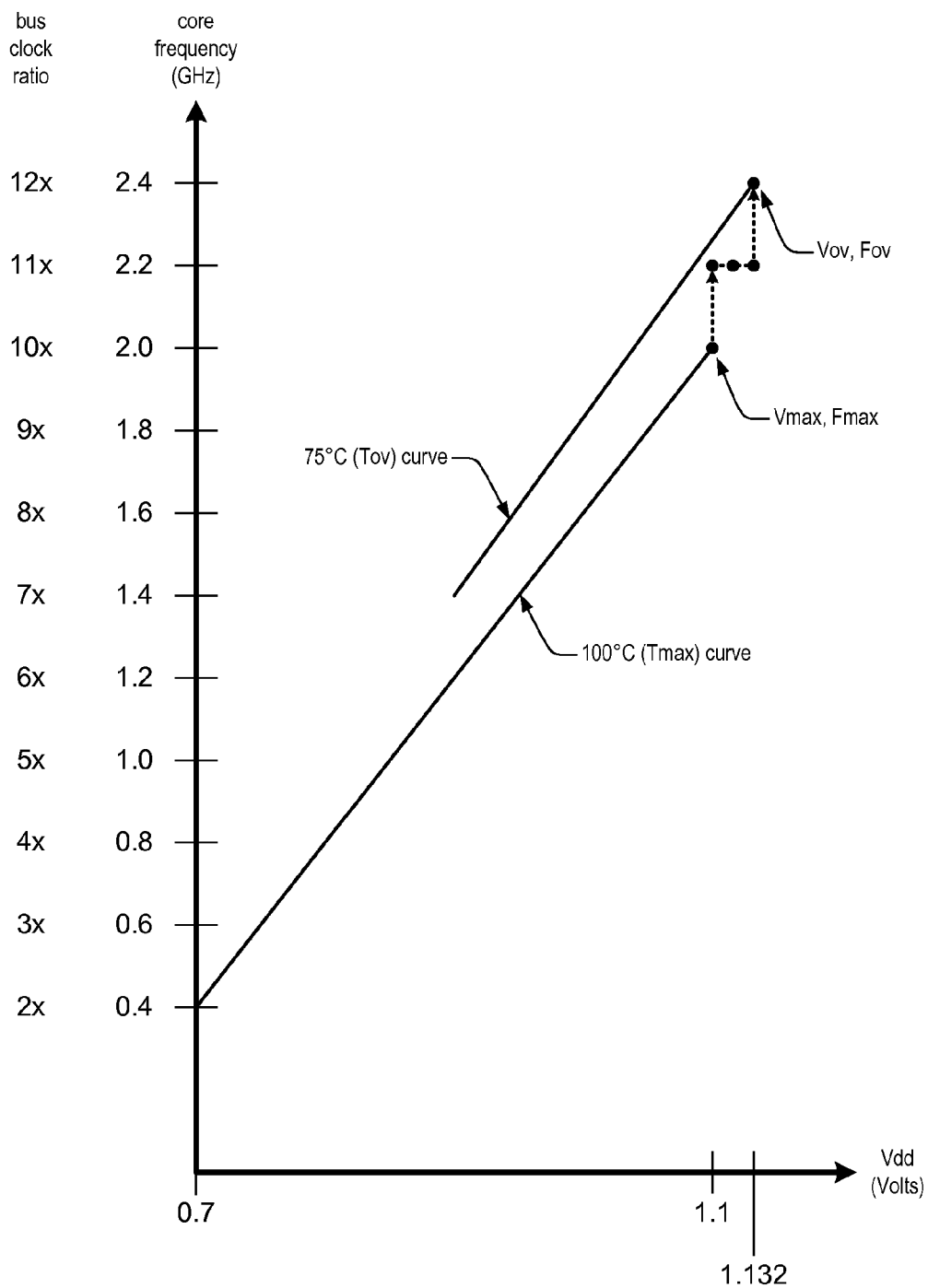
FIG. 8 is a graph further illustrating, by an example, the method of operating the microprocessor of FIG. 1 in overstress mode according to the embodiment of FIG. 7.

At block 706, the manufacturer determines the maximum operating frequency, referred to as $F_{max}$, at which the part 102 can reliably operate at $T_{max}$. The manufacturer also determines the operating voltage, $V_{max}$, required for the part 102 to reliably operate at $F_{max}$ and $T_{max}$. According to one embodiment, the operating point information for the $T_{max}$ values is determined according to the embodiment of FIG. 13. In the embodiment of FIG. 8, the values of $V_{max}$ and $F_{max}$ are 1.1 V and 2.0 GHz (10× ratio), respectively. Flow proceeds to block 708.

At block 708, the manufacturer selects an overstress operating temperature, referred to as $T_{ov}$, and includes the $T_{ov}$ value in the operating point data 122. The $T_{ov}$ value is less than the $T_{max}$ value. The $T_{ov}$ value may also be determined based on device technology and customer requirements, among other factors, as well as expected typical cooling systems provided by computer system manufacturers. In one embodiment, the $T_{ov}$ value is 75° C., as shown in FIG. 8, although other values may be chosen. Flow proceeds to block 712.

At block 712, the manufacturer determines the maximum operating frequency, referred to as $F_{ov}$, at which the part 102 can reliably operate at $T_{ov}$. The manufacturer also determines the operating voltage, $V_{ov}$, required for the part 102 to reliably operate at $F_{ov}$ and $T_{ov}$. According to one embodiment, the operating point information for the $T_{ov}$ values is determined according to the embodiment of FIG. 13. In the embodiment of FIG. 8, the values of $V_{ov}$ and $F_{ov}$ are 1.132 V and 2.4 GHz (12× ratio), respectively. The various values required to operate the microprocessor 102 in overstress mode, such as $T_{max}$, $T_{ov}$, $V_{max}$, $V_{ov}$, $F_{max}$, and $F_{ov}$, are stored within the microprocessor 102 and may be included as part of the operating point data 122 of FIG. 1. Flow proceeds to block 714.

At block 714, the microprocessor 102 monitors its temperature while operating. That is, the temperature sensor 132 senses the current operating temperature and provides the temperature 134 to the voltage/frequency control 104 of FIG. 1. Initially, the microprocessor 102 operates at $V_{max}$ and $F_{max}$. In one embodiment, system software may program the microprocessor 102 to enable or disable operation of the overstress mode. Flow proceeds to decision block 716.

At decision block 716, the voltage/frequency control 104 determines whether the current temperature 134 is less than the $T_{ov}$ value determined at block 708. The current operating temperature 134 may drop below the $T_{ov}$ value for various reasons, such as a reduction in the workload placed upon the microprocessor 102 or changes in the ambient conditions or cooling system. Advantageously, as shown in FIG. 7, the voltage/frequency control 104 may take advantage of the drop in the temperature 134 by increasing the core clock frequency 116 to increase the performance of the microprocessor 102. If the current temperature 134 is not less than the $T_{ov}$ value, flow proceeds to decision block 724; otherwise, flow proceeds to decision block 718.

At decision block 718, the voltage/frequency control 104 determines whether the core clock frequency 116 is already at the overstress frequency $F_{ov}$. If so, flow returns to block 714 to continue monitoring the temperature 134; otherwise, flow proceeds to block 722.

At block 722, the voltage/frequency control 104 controls the VRM 108 and PLLs 112 to cause the microprocessor 102 to operate at the $F_{ov}$ and $V_{ov}$ values, as shown in FIG. 8. Preferably, the voltage/frequency control 104 transitions to operation at $F_{ov}$ and $V_{ov}$ in a manner similar to that described herein with respect to steps 206 through 224 of FIG. 2 proceeding along the $T_{ov}$ curve, i.e., on the curve at which the microprocessor 102 is capable of operating at the overstress temperature value $T_{ov}$. Flow returns to block 714 to continue monitoring the temperature 134.

At decision block 724, the voltage/frequency control 104 determines whether the core clock frequency 116 is already at the maximum frequency $F_{max}$. If so, flow returns to block 714 to continue monitoring the temperature 134; otherwise, flow proceeds to block 726. As discussed herein, embodiments are contemplated in which the TM3 mechanism of FIG. 9 may be used in combination with the overstress mechanism of FIG. 7, in which case, flow may proceed from decision block 724 to decision block 918 of FIG. 9.

At block 726, the voltage/frequency control 104 controls the VRM 108 and PLLs 112 to cause the microprocessor 102 to operate at the $F_{max}$ and $V_{max}$ values, as shown in FIG. 8. Preferably, the voltage/frequency control 104 transitions to operation at $F_{max}$ and $V_{max}$ in a manner similar to that described herein with respect to steps 226 through 242 of FIG. 2 proceeding along the $T_{max}$ curve, i.e., on the curve at which the microprocessor 102 is capable of operating at the $T_{max}$ value. The current operating temperature 134 may rise above the $T_{ov}$ value as detected at decision block 716 for various reasons, such as an increase in the workload placed upon of the microprocessor 102 or changes in the operating environment. Advantageously, according to the steps at blocks 724 and 726, the voltage/frequency control 104 may avoid overheating the microprocessor 102 by sensing the increase in the temperature 134 and reducing the core clock frequency 116 when necessary, thereby enabling at other times the microprocessor 102 to take advantage of operating in overstress mode when possible. Flow returns to block 714 to continue monitoring the temperature 134.

Figure 10:
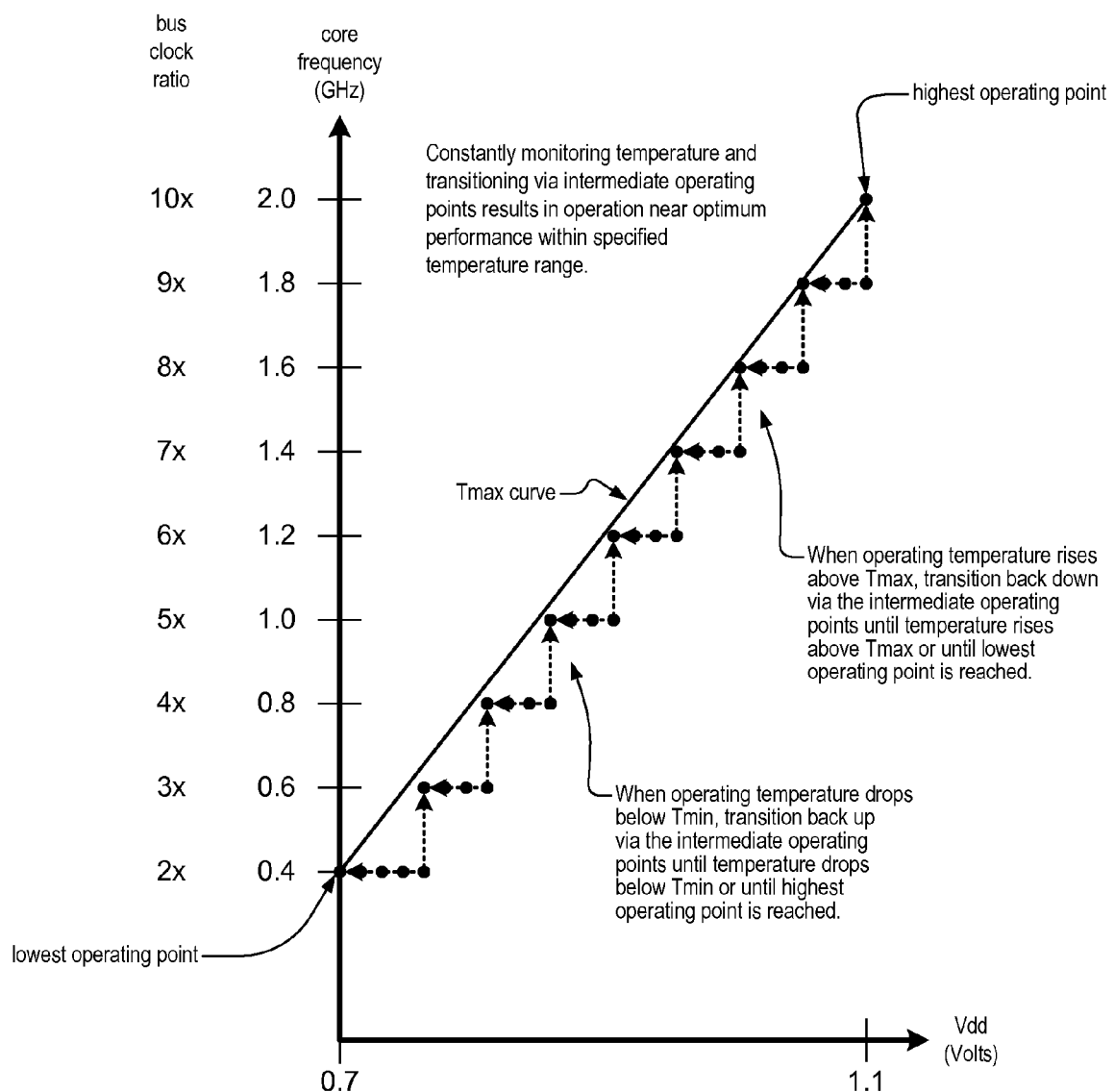
FIG. 10 is a graph further illustrating, by an example, the method of dynamically optimizing the performance of the microprocessor of FIG. 1 within a specified temperature range according to the embodiment of FIG. 9.

Referring now to FIG. 8, a graph further illustrating, by an example, the method of operating the microprocessor 102 of FIG. 1 in overstress mode according to the embodiment of FIG. 7 is shown. The independent variable on the horizontal axis of the graph is the operating voltage $V_{dd}$ 142 measured in Volts. The domain of the $V_{dd}$ 142 value is from 0.7 V to 1.1 V. The dependent variable on the vertical axis of the graph is the core clock frequency 116 measured in GHz. In the example of FIG. 10, the bus clock frequency is 200 MHz, the range of bus clock ratios is 2× to 10×, resulting in a corresponding core clock frequency 116 range of 400 MHz to 2.0 GHz. The graph, according to FIG. 7, shows a transition from the operating point values of $V_{max}$ and $F_{max}$ at 1.1 V and 2.0 GHz (10× ratio), respectively, to the overstress operating point values of $V_{ov}$ and $F_{ov}$ at 1.132 V and 2.4 GHz (12× ratio), respectively, on the 75° C. $T_{ov}$ value curve.

An advantage of the overstress mode operation described herein is that it may operate with the conventional cooling system provided in a computer system 100 incorporating the microprocessor 102. The overstress mode enables the microprocessor 102 to dynamically operate at the overstress frequency or below the overstress frequency at different times depending upon whether the workload and/or operating environment are such that the cooling system may adequately cool the microprocessor 102. In contrast, conventional overclocking methods do not monitor the temperature of the microprocessor 102 in order to automatically dynamically change the frequency. That is, the frequency is fixed at the overclock frequency, or at best changeable by the user via the BIOS, which is not amenable to guaranteeing reliable operation of the microprocessor. Overstress mode provides a similar advantage over conventional overclocking schemes that unlock the bus frequency ratio by connecting electrical contacts across points on the outer surface of the microprocessor, such as provided by certain AMD Athlon parts. Another advantage of overstress mode is that the other devices that may be connected to the front side bus need not operate at the higher clock frequency and therefore are not subject to the additional cooling and unreliability problems. Another advantage of overstress mode is that because the frequency changes are internal to the microprocessor 102, there is no requirement to stop the external processor bus when changing frequencies. Another advantage is that the overstress method described herein enables the microprocessor 102 manufacturer to test operation in the overstress mode to guarantee reliable operation of the microprocessor at the overstress operating point, whereas conventional after market overclocking schemes do not.

Figure 9:
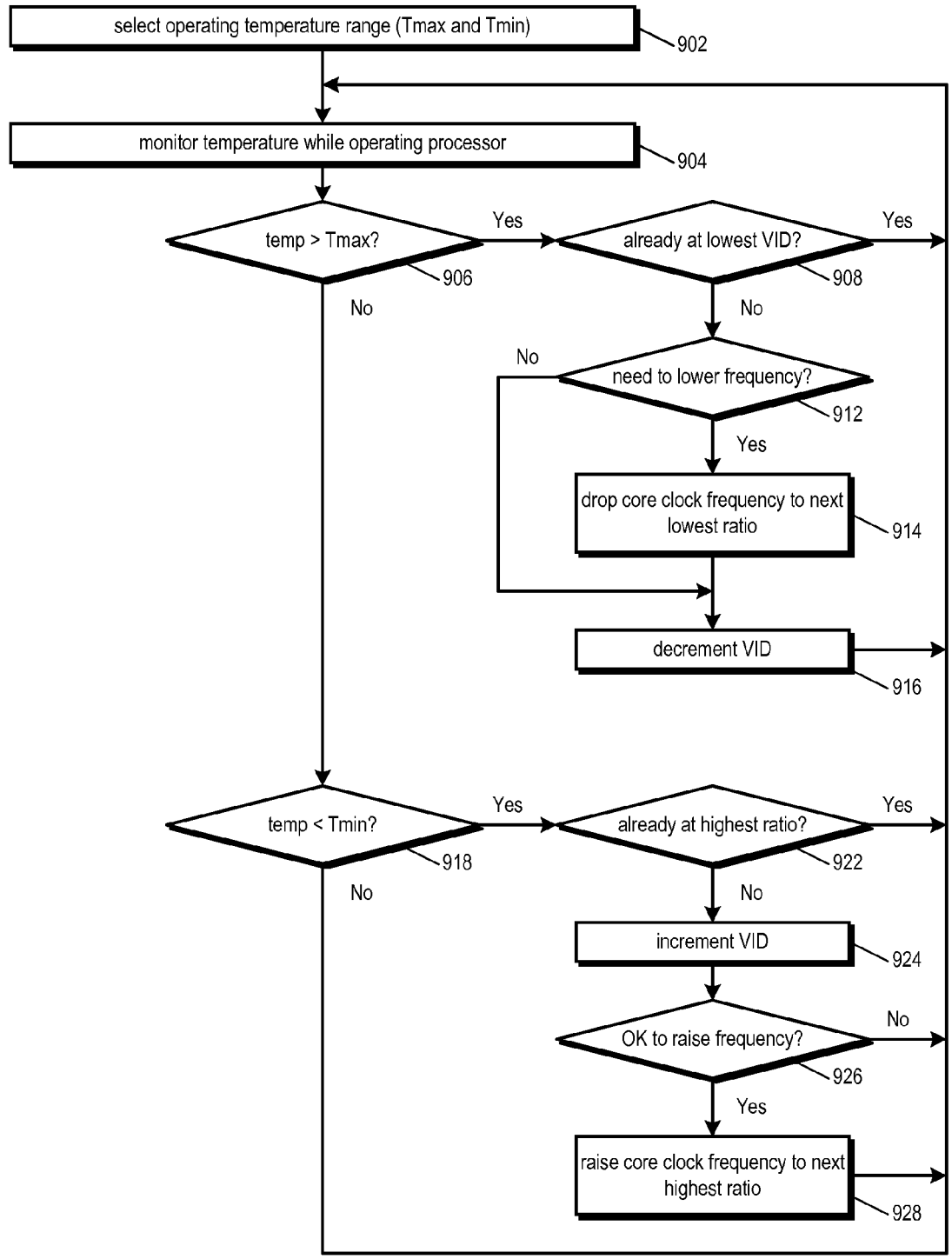
FIG. 9 is a flowchart illustrating a method for dynamically operating the microprocessor of FIG. 1 at or near optimum performance within a specified temperature range according to the present invention.

Referring now to FIG. 9, a flowchart illustrating a method for dynamically operating the microprocessor 102 of FIG. 1 at or near optimum performance within a specified temperature range according to the present invention is shown. The method illustrated in FIG. 9 is referred to herein as "TM3" because it is an improvement over the well-known Intel "TM2" (Thermal Monitor 2) feature. Flow begins at block 902.

At block 902, an operating temperature range is selected. This is the temperature range in which it is desired that the microprocessor 102 should operate, but at the optimum performance within the temperature range. The temperature range is defined by a minimum temperature ($T_{min}$) and a maximum temperature ($T_{max}$). In one embodiment, the $T_{max}$ and $T_{min}$ values may be specified by either a $T_{max}$ or $T_{min}$ value and a delta, or range width, value from the $T_{max}$ or $T_{min}$ value. In one embodiment, system software programs the range into the programmable registers 158. In one embodiment, the programmed values may be selectable by a user. The temperature range values 162 are provided to the voltage/frequency control 104 of FIG. 1. In one embodiment, the temperature range is predetermined by the microprocessor 102 manufacturer. In one embodiment, the predetermined range operates as the default temperature range, which may be changed by programming of the registers 158. In one embodiment, the $T_{max}$ value is predetermined by the microprocessor 102 manufacturer and the $T_{min}$ value is programmable by system software. In one embodiment, the TM3 feature may be enabled or disabled by system software. Flow proceeds to block 904.

At block 904, the microprocessor 102 monitors its operating temperature. That is, the temperature sensor 132 senses the current operating temperature and provides the temperature 134 to the voltage/frequency control 104 of FIG. 1. Initially the microprocessor 102 operates at a default core clock 116 frequency and voltage $V_{dd}$ 142 operating point. However, over time the voltage/frequency control 104 transitions to many different operating points as the operating temperature 134 varies, as described herein. As discussed herein, the operating temperature 134 may vary over time based on a number of factors, including workload, ambient conditions, and cooling systems. Flow proceeds to decision block 906.

At decision block 906, the voltage/frequency control 104 determines whether the current temperature 134 is greater than the $T_{max}$ value determined at block 902. If not, flow proceeds to decision block 918; otherwise, flow proceeds to decision block 908.

At decision block 908, the voltage/frequency control 104 determines whether the operating voltage $V_{dd}$ 142 is already at the lowest VID 144 value supported by the VRM 108. In the example shown in FIG. 10, the operating voltage $V_{dd}$ 142 at 0.7 V is the lowest value supported by the VRM 108. If the operating voltage $V_{dd}$ 142 is already at the lowest supported VID 144 value, flow returns to block 904 to continue monitoring the temperature 134; otherwise, flow proceeds to decision block 912.

At decision block 912, the voltage/frequency control 104 determines from the operating point data 122 whether the operating core clock 116 frequency needs to be lowered based on the fact that the operating voltage $V_{dd}$ 142 is about to be lowered at block 916 to the next lowest VID 144. If not, flow proceeds to block 916; otherwise, flow proceeds to block 914.

At block 914, the clock ratio control 128 causes a transition of the core clock 116 frequency to the next lowest ratio of the bus clock 148 below the current core clock 116 frequency required by the new VID 144 which will be output at block 916. Advantageously, the transition is performed as described herein with respect to steps 226 through 242 of FIG. 2, thereby avoiding the loss of performance incurred by conventional methods that stop the core clock while waiting for the PLL to lock in. That is, because the microprocessor 102 can effectively make operating point transitions without penalty (i.e., it can perform effectively instantaneous core clock 116 frequency changes with the dual PLLs 112 and can continue to operate reliably while the VRM 108 changes the $V_{dd}$ 142 value), the voltage/frequency control 104 can afford to make relatively frequent operating point transitions when necessary, such as when the workload varies widely and frequently, to keep the microprocessor 102 operating within the temperature range specified at block 902. Flow proceeds to block 916.

At block 916, the VID control 126 decrements the VID 144 value to cause the VRM 108 to transition to the next lowest $V_{dd}$ 142 output level. Advantageously, the transition is performed as described herein with respect to steps 226 through 242 of FIG. 2, thereby avoiding any loss of performance because the microprocessor 102 can continue to operate reliably while the VRM 108 changes the $V_{dd}$ 142 value. Thus, the voltage/frequency control 104 can afford to make relatively frequent operating point transitions if necessary to keep the microprocessor 102 operating within the temperature range specified at block 902. Flow returns to block 904 to continue monitoring the temperature 134.

At decision block 918, the voltage/frequency control 104 determines whether the current temperature 134 is less than the $T_{min}$ value determined at block 902. If not, flow returns to block 904 to continue monitoring the temperature 134; otherwise, flow proceeds to decision block 922.

At decision block 922, the voltage/frequency control 104 determines whether the core clock frequency 116 is already at the highest operating frequency supported by the PLLs 112. In the example shown in FIG. 10, the operating frequency at 2.0 GHz (10× ratio) is the highest operating frequency supported by the microprocessor 102. However, it is noted that the steps of FIG. 9 may also be incorporated with the steps of FIG. 7 such that the highest operating point supported by the microprocessor 102 is an overstress operating point, such as the operating point at 2.4 GHz (12× ratio) and 1.132 V shown in FIG. 8. If the core clock frequency 116 is already at the highest operating frequency, flow returns to block 904 to continue monitoring the temperature 134; otherwise, flow proceeds to block 924.

At block 924, the VID control 126 increments the VID 144 value to cause the VRM 108 to transition to the next highest $V_{dd}$ 142 output level. Advantageously, the transition is performed as described herein with respect to steps 206 through 224 of FIG. 2. Flow proceeds to decision block 926.

At decision block 926, the voltage/frequency control 104 determines from the operating point data 122 whether it is permissible to raise the operating core clock 116 frequency based on the fact that the operating voltage $V_{dd}$ 142 was raised at block 924 to the next highest VID 144. If not, flow returns to block 904 to continue monitoring the temperature 134; otherwise, flow proceeds to block 928.

At block 928, the clock ratio control 128 causes a transition of the core clock 116 frequency to the next highest ratio of the bus clock 148 above the current core clock 116 frequency that is allowed by the new VID 144 output at block 924. Advantageously, the transition is performed as described herein with respect to steps 206 through 224 of FIG. 2, thereby avoiding the loss of performance incurred by conventional methods that stop the core clock while waiting for the PLL to lock in. Flow returns to block 904 to continue monitoring the temperature 134.

Referring now to FIG. 10, a graph further illustrating, by an example, the method of dynamically optimizing the performance of the microprocessor 102 of FIG. 1 within a specified temperature range according to the embodiment of FIG. 9 is shown. The independent variable on the horizontal axis of the graph is the operating voltage $V_{dd}$ 142 measured in Volts. The domain of the $V_{dd}$ 142 value is from 0.7 V to 1.1 V. The dependent variable on the vertical axis of the graph is the core clock frequency 116 measured in GHz. In the example of FIG. 10, the bus clock frequency is 200 MHz, the range of bus clock ratios is 2× to 10×, resulting in a corresponding core clock frequency 116 range of 400 MHz to 2.0 GHz. The graph, according to FIG. 9, shows transitions between the lowest and highest operating points via a plurality of intermediate operating points. As shown, the voltage/frequency control 104 constantly monitors the operating temperature 134 and transitions between the various adjacent operating points, without stopping the core clock 116, in order to maintain the operating temperature 134 within the specified range. Thus, the embodiment of FIG. 9 advantageously keeps the core logic 106 operating close to the optimum performance level possible for the workload level, ambient conditions, and cooling system at a given time.

Figure 11:
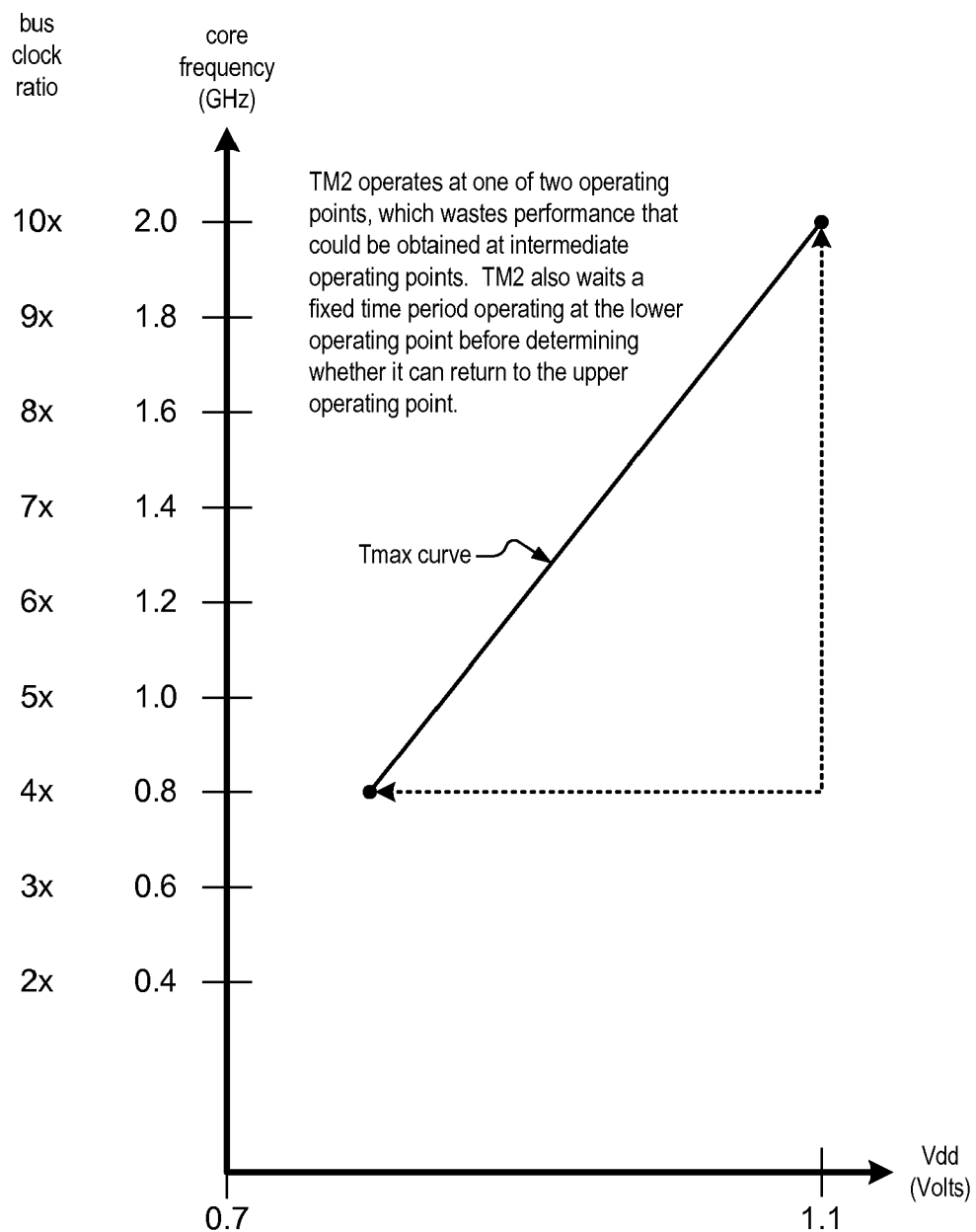
FIG. 11 is a graph illustrating operation of the TM2 thermal monitoring and protection mechanism.

Referring now to FIG. 11, a graph illustrating operation of the TM2 thermal monitoring and protection mechanism is shown. Operation of the TM2 mechanism, as described in the Intel documentation, is provided above near the end of the Background section. It is noted that the operating point values provided in the example of FIG. 11 are not intended to represent values employed in a particular Intel processor. Rather, the values provided in FIG. 11 are selected for ease of comparison with the values shown in FIG. 10.

As discussed herein, if with the TM2 method the system software programs the lower operating point to a location relatively close to the upper operating point, then the TM2 mechanism may not be able to provide the necessary thermal protection during heavy workloads and/or hot environmental conditions. Alternatively, as the system software programs the lower operating point to a location relatively farther from the upper operating point, the TM2 mechanism potentially wastes a large amount of performance in terms of clock cycles because it only transitions between two distant operating points. Stated alternatively, the TM2 mechanism forces the system software to make a tradeoff between operating point granularity (which translates into performance granularity) and thermal protection during possible hot conditions. In contrast, as may be observed by examining FIG. 9 and by comparing FIGS. 10 and 11, the TM3 mechanism does not force the system software to make the performance thermal protection tradeoff; rather, the TM3 mechanism provides both: performance-capturing fine-grained operating point transitions (effectively the entire range of possible operating point combinations of the VRM 108 VID 144 range and the PLL 112 ratio range) and a large range of operating points in order to provide the needed thermal protection during heavy workloads and/or hot environmental conditions. Stated alternatively, once the TM2 method reaches its maximum operating temperature, it immediately transitions down to the low performance operating point, which is potentially unnecessary because a transition to an intermediate operating point might be sufficient to reduce the operating temperature below the maximum temperature. In contrast, the TM3 mechanism advantageously captures the additional performance by transitioning to intermediate operating points only as far as necessary to keep the operating temperature within the selected range.

Another advantage of the TM3 approach over the TM2 approach is that it does not suffer the potential performance disadvantage of operating the fixed time period at the lower operating point before transitioning to a higher operating point like the TM2 mechanism. Rather, the TM3 mechanism transitions up to a higher operating point when the temperature reaches the lower bound of the specified temperature range. Advantageously, the microprocessor 102 includes a clock generation circuit, namely the dual-PLL configuration, which facilitates transitions from a current operating frequency to a new operating frequency without stopping operation of the processor core, thereby avoiding a negative performance impact of relatively frequent operating frequency transitions if the workload and operating environment dictate them.

Another advantage of the TM3 approach is that it may provide an alternative to existing thermal management approaches that have undesirable side effects. For example, some systems implement variable speed fans that speed up when the operating temperature of the microprocessor exceeds a threshold in order to reduce the operating temperature. Typically, an undesirable side effect of the fan speed increase is additional noise. The TM3 approach advantageously provides an alternative approach for keeping the operating temperature down without the added fan noise.

Furthermore, the Intel documentation states that the trip temperature for TM2 is factory set. In contrast, according to one embodiment of the TM3 mechanism, the temperature range is user-selectable. Thus, if there is a desire to prolong battery life, for example, by reducing the battery temperature, which may be affected by the heat the microprocessor generates, the embodiment of TM3 advantageously allows the system software to program the microprocessor 102 with a relatively low temperature range.

Finally, the present inventors have observed that due to the physical characteristics of CMOS semiconductor integrated circuits, in a given manufactured lot of parts, counter-intuitively there may be some parts that fail the corner case of operating at the highest voltage and lowest frequency. When transitioning from the high operating point to the low operating point, the TM2 mechanism first reduces the frequency, then the voltage. Because the possibility exists within a processor implementing the TM2 mechanism that the lower operating point may be programmed at the lowest frequency, the parts that fail the corner case may need to be discarded from the yield because they might fail when TM2 was performed. Thus, an advantage of TM3 is that a yield increase may be realized since the frequency is reduced in a piecewise fashion such that the microprocessor 102 is not operating at the lowest frequency while operating at the highest voltage.

Figure 12:
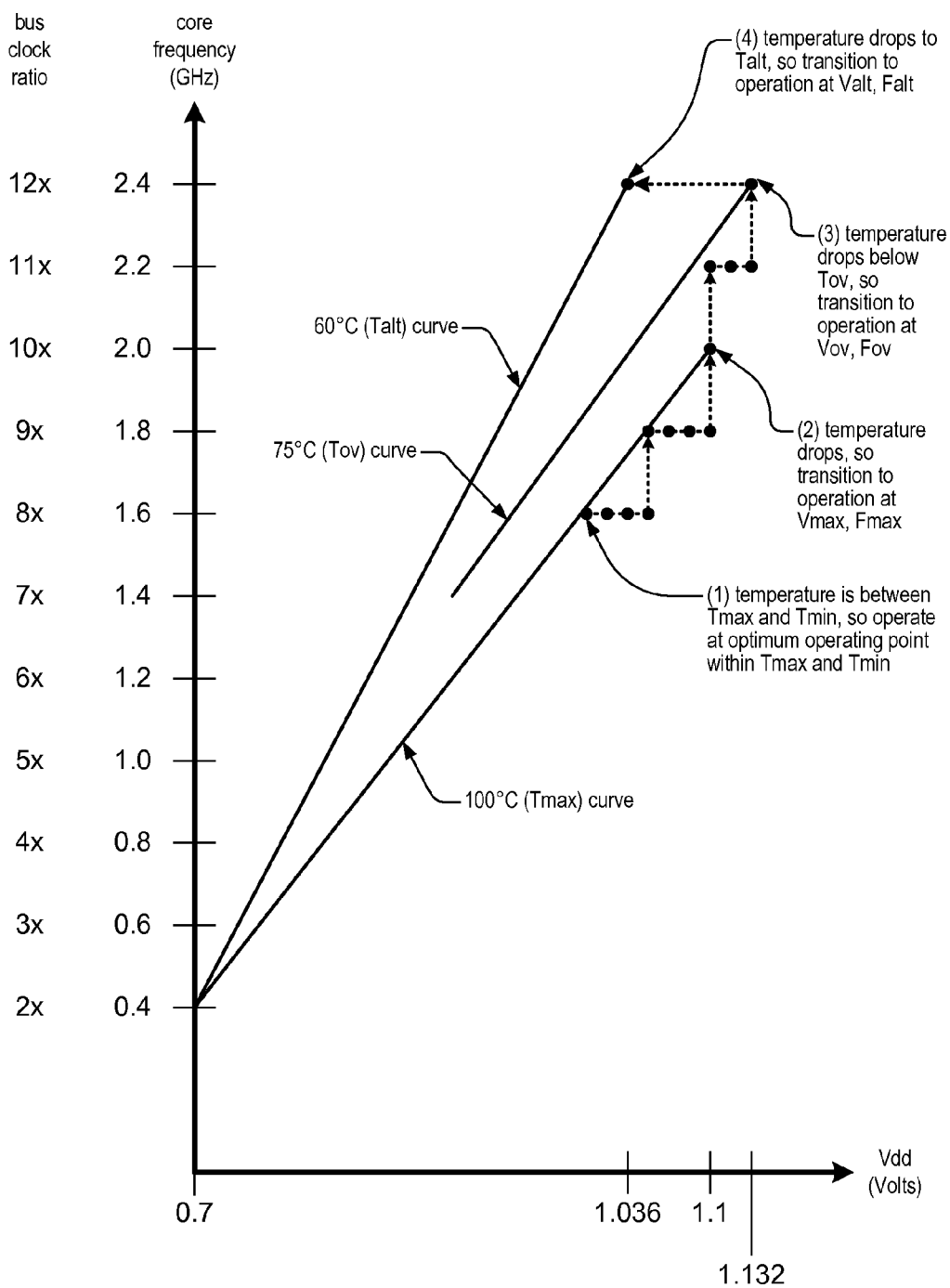
FIG. 12 is a graph illustrating operation of the microprocessor according to an embodiment of the present invention in which the features described with respect to FIGS. 5, 7, and 9 are employed in combination.

Referring now to FIG. 12, a graph illustrating operation of the microprocessor 102 according to an embodiment of the present invention in which the features described with respect to FIGS. 5, 7, and 9 are employed in combination is shown. That is, FIG. 12 provides an example that illustrates that the TM3 technique of FIG. 9, the overstress technique of FIG. 7, and the power consumption reduction technique of FIG. 5 may all be employed in combination to improve the performance and/or reduce the power consumption of the microprocessor 102. Furthermore, the various operating point transitions may be performed in an iterative manner similar to the technique described with respect to FIG. 2 in order to improve the performance of the microprocessor 102 during the operating point transitions where possible.

In the example of FIG. 12, the temperature had risen to $T_{max}$ as referred to with respect to FIGS. 9 and 10. Consequently, the voltage/frequency control 104 is causing the microprocessor 102 to operate at an intermediate operating point between the highest operating point and the lowest operating point that is at or near the optimum performance operating point that the workload and operating environment will permit while keeping the operating temperature between the $T_{max}$ and $T_{min}$ values as referred to herein with respect to the TM3 technique of FIGS. 9 and 10. Subsequently, the workload and/or operating environment change such that the temperature drops, and the voltage/frequency control 104 responsively transitions operation of the microprocessor 102 to the $V_{max}/F_{max}$ operating point according to the steps of FIG. 9.

Subsequently, the workload and/or operating environment change such that the temperature drops below the $T_{ov}$ value as referred to with respect to FIGS. 7 and 8, and the voltage/frequency control 104 responsively transitions operation of the microprocessor 102 to the $V_{ov}/F_{ov}$ operating point according to the steps of the overstress technique of FIG. 7.

Subsequently, the workload and/or operating environment change such that the temperature drops below the $T_{alt}$ value as referred to with respect to FIGS. 5 and 6, and the voltage/frequency control 104 responsively transitions operation of the microprocessor 102 to the $V_{alt}/F_{alt}$ operating point according to the steps of the power consumption reduction technique of FIG. 5.

In addition to the embodiment of FIG. 12 in which all of the techniques are employed in combination, it should be understood that other embodiments are contemplated which employ fewer than all of the techniques in various combinations in the microprocessor 102. For example, in one embodiment, the steps of FIG. 5 are performed in conjunction with the steps of FIG. 7. That is, once the microprocessor 102 has been set to operate at the overstress operating point, if the $T_{alt}$ temperature is less than the overstress temperature and the operating temperature reaches $T_{alt}$, then the operating voltage may be reduced from the overstress operating point voltage to the $T_{alt}$ operating point voltage, in order to reduce the power consumption while enjoying the performance benefit of operating in overstress mode. In one embodiment, the steps of FIG. 5 are performed in conjunction with the steps of FIG. 9.

That is, while the microprocessor 102 is operating within the selected operating temperature range defined by $T_{max}$ and $T_{min}$, if the $T_{alt}$ temperature is less than $T_{min}$ and the operating temperature reaches $T_{alt}$, then the operating voltage may be reduced from the current operating point voltage to the $T_{alt}$ operating point voltage, in order to reduce the power consumption while enjoying the benefit of operating at or near the optimum performance within the specified temperature range. Other combinations of the techniques are contemplated.

Referring now to FIG. 13, a flowchart illustrating a process for creating operating point information included in the operating point data 122 of the microprocessor 102 of FIG. 1 according to an embodiment of the present invention is shown. Flow begins at block 1302.

At block 1302, the manufacturer selects the maximum operating temperature at which the microprocessor 102 is specified to reliably operate, such as $T_{max}$ discussed with respect to FIGS. 5, 7, and 9. Flow proceeds to block 1304.

At block 1304, the manufacturer tests a microprocessor 102 part at each possible operating point combination of the VRM 108 $V_{dd}$ 142 values (i.e., VID 144 values) and PLL 112 clock frequency 152 values (i.e., ratio 146 values), while maintaining operation of the part at the selected operating temperature, to determine whether the part will reliably operate at the operating point and selected temperature. Flow proceeds to block 1306.

At block 1306, the manufacturer selects, for each of the VID 144 values, the highest frequency ratio 146 at which the part reliably operated. The manufacturer may generate an operating point curve for the selected operating temperature using the selected operating points. The operating point curves are commonly referred to as shmoo curves, or shmoos. Examples of the operating point curves are shown in FIGS. 3, 6, 8, 12 and 14, in which cases the curves are lines. By determining the operating point data 122, the manufacturer can insure reliable operation of the microprocessor 102 at or below the operating point curves. In particular, the microprocessor 102 may use the operating point data 122 to make power management decisions, such as those at decision boxes 208, 228, 912 and 926 of FIGS. 2 and 9. Additionally, the manufacturer may use the results of the testing at block 1304 to sort the parts into different marketability categories, or bins. Flow proceeds to decision block 1308.

At decision block 1308, the manufacturer determines whether there are more operating temperatures for which it desires to test the part for reliable operation. If so, flow proceeds to block 1312; otherwise, flow ends.

At block 1312, the microprocessor 102 manufacturer selects a new operating temperature for which it desires to obtain operating point information. In particular, the manufacturer may select the $T_{alt}$ value of FIG. 5, the $T_{ov}$ value of FIG. 7, and the $T_{min}$ value of FIG. 9. Additionally, or alternatively, the manufacturer may select several different operating temperature values for which to perform steps 1304 and 1306, and may select the default $T_{ov}$, $T_{alt}$ and $T_{min}$ values based on the data obtained from those steps, rather than selecting the $T_{ov}$, $T_{alt}$ and $T_{min}$ values a priori. Flow proceeds to block 1304.

Referring now to FIG. 14, a flowchart illustrating operation of the microprocessor 102 of FIG. 1 to successively reduce the operating voltage when the operating temperature of the microprocessor 102 is below corresponding successively lower temperature thresholds in order to save power according to an alternate embodiment is shown. In contrast to the embodiment of FIG. 5 which includes only a single alternate operating temperature threshold, the embodiment of FIG. 14 includes multiple alternate operating temperature thresholds to facilitate reduced power consumption on a more fine-grained temperature variation basis as described below. Flow begins at block 1402.

At block 1402, the microprocessor 102 manufacturer tests the microprocessor 102 to determine a minimum voltage, V[N], at which the microprocessor 102 will reliably operate at a given frequency, F, and at a maximum operating temperature, T[N], which is also referred to herein as $T_{max}$. In particular, the manufacturer determines the maximum VID 144 value at which the microprocessor 102 will reliably operate at F and T[N]. In this embodiment, N refers to the number of different VID 144 values at the frequency F (i.e., the number of operating points) at which the voltage/frequency control 104 may cause the microprocessor 102 to operate as the operating temperature 134 drops below N−1 different successive values. The manufacturer determines the V[N] value for each core clock 116 frequency value (i.e., for each of the possible ratios 146). Flow proceeds to block 1404.

At block 1404, the microprocessor 102 manufacturer tests the microprocessor 102 to determine a minimum voltage, V[1], at which the microprocessor 102 will reliably operate at frequency F and at an alternate operating temperature, T[1], which is less than the T[N] value. The manufacturer determines the V[1] value for each core clock 116 frequency value. Flow proceeds to block 1406.

At block 1406, the manufacturer selects N−2 intermediate VID 144 values between the V[N] and V[1] values determined at blocks 1402 and 1404. In one embodiment, the manufacturer computes the difference between V[N] and V[1] and then divides by N−1 to determine the incremental distance between each successive intermediate voltage value, which may require rounding down to the nearest VID 144 value. In one embodiment, the manufacturer selects N−2 intermediate VID 144 values that are not necessarily evenly spaced. In one embodiment, all the VID 144 values between V[N] and V[1] are included. For some values of F, the difference between V[N] and V[1] may not be sufficient to accommodate N different VID 144 values. More generally, the value of N may be different for different values of F. Flow proceeds to block 1408.

At block 1408, the manufacturer determines N−2 intermediate alternate operating temperature 134 values at which the microprocessor 102 may reliably operate at the frequency F that correspond to the intermediate VID 144 values determined at block 1406. In one embodiment, the manufacturer computes each intermediate alternate temperature value relative to the T[N] and T[1] values proportionate to the location of its corresponding voltage value between the V[N] and V[1] values. Other embodiments are contemplated in which the computation of the corresponding intermediate alternate temperature values is non-proportionate based on empirical testing. Other embodiments are contemplated in which the manufacturer tests each part at each of the intermediate alternate temperature values to determine the corresponding intermediate voltage values, rather than computing them. Flow proceeds to block 1412.

At block 1412, the VID 144 and corresponding temperature values, referred to as V[i] and T[i], determined at blocks 1402 through 1408 are included as a table in the operating point data 122 of FIG. 1. The operating point data 122 includes a table for each of the F values. Herein, reference is made to an entry in the table via an index value, "i", in which a value of i=N indexes the table entry specifying the $T_{max}$ value and its corresponding V[N] VID 144 determined at block 1402, a value of i=1 indexes the table entry specifying the values determined at block 1404, and a value of i between 1 and N indexes a table entry specifying one of the intermediate V[i]/T[i] pairs determined at blocks 1406 and 1408. Flow proceeds to block 1414.

At block 1414, the index value is initialized to N when the microprocessor 102 is reset so that the voltage/frequency control 104 will cause the microprocessor 102 to operate at the V[n] value. Flow proceeds to block 1416.

At block 1416, the microprocessor 102 monitors its temperature while operating at frequency F and voltage V[i], which is the $V_{dd}$ 142 value output by the VRM 108 of FIG. 1 in response to the VID control 126 outputting a VID 144 value from the operating point data 122 table entry selected by the index value that was initialized at block 1414. Flow proceeds to decision block 1418.

At decision block 1418, the voltage/frequency control 104 determines whether the index value is equal to 1. If so, flow proceeds to decision block 1426; otherwise, flow proceeds to decision block 1422.

At decision block 1422, the voltage/frequency control 104 determines whether the current temperature 134 is less than the temperature value T[i−1] specified in the operating point data 122 table entry selected by the index value minus 1. If the current temperature 134 is not less than the T[i−1] value, flow proceeds to decision block 1426; otherwise, flow proceeds to block 1424.

At block 1424, the voltage/frequency control 104 outputs to the VRM 108 the VID value 144 specified in the operating point data 122 table entry selected by the index value minus 1 to reduce the operating voltage $V_{dd}$ 142. Also, the voltage/frequency control 104 decrements the index value. Flow returns to block 1416.

At decision block 1426, the voltage/frequency control 104 determines whether the index value is equal to N. If so, flow returns to block 1416; otherwise, flow proceeds to decision block 1428.

At decision block 1428, the voltage/frequency control 104 determines whether the current temperature 134 is greater than the temperature value T[i+1] specified in the operating point data 122 table entry selected by the index value plus 1. If the current temperature 134 is not greater than the T[i+1] value, flow returns to block 1416; otherwise, flow proceeds to block 1432.

At block 1432, the voltage/frequency control 104 outputs to the VRM 108 of FIG. 1 the VID value 144 specified in the operating point data 122 table entry selected by the index value plus 1 to increase the operating voltage $V_{dd}$ 142. Also, the voltage/frequency control 104 increments the index value. Flow returns to block 1416.

Referring now to FIG. 15, a graph further illustrating operation of the microprocessor 102 as described with respect to the embodiment of FIG. 14 is shown. The independent variable of the graph is the operating voltage $V_{dd}$ 142 on the horizontal axis measured in Volts. The dependent variable of the graph is the core clock frequency 116 on the vertical axis measured in GHz. In the embodiment of FIG. 6, the bus clock frequency is 200 MHz, the range of bus clock ratios is 2× to 10×, resulting in a core clock frequency 116 range of 400 MHz (2× ratio) to 2.0 GHz (10× ratio). The example shown in FIG. 15 illustrates values for the 2.0 GHz frequency only. The example shown in FIG. 15 illustrates an embodiment in which there are five (5) different possible operating temperature 134 thresholds, T[1]=60° C., T[2]=70° C., T[3]=80° C., T[4]=90° C., and T[5]=100° C., and five corresponding operating voltage values, denoted V[1]=0.972V, V[2]=1.004V, V[3]=1.036V, V[4]=1.068V, and V[5]=1.10V. The graph shows two voltage/frequency curves, one for the highest operating temperature 134 value and one for the lowest operating temperature 134 value. In the example of FIG. 15, if while operating at 2.0 GHz at 1.1V the voltage/frequency control 104 determines that the temperature 134 has dropped below 90° C., the voltage/frequency control 104 reduces the $V_{dd}$ 142 value from 1.1 V to 1.068 V; if the temperature 134 subsequently drops below 80° C., the voltage/frequency control 104 reduces the $V_{dd}$ 142 value to 1.036 V; if the temperature 134 subsequently drops below 70° C., the voltage/frequency control 104 reduces the $V_{dd}$ 142 value to 1.004 V; if the temperature 134 subsequently drops below 60° C., the voltage/frequency control 104 reduces the $V_{dd}$ 142 value to 0.972 V. Conversely, if while operating at 2.0 GHz at 0.972V the voltage/frequency control 104 determines that the temperature 134 has risen above 70° C., the voltage/frequency control 104 increases the $V_{dd}$ 142 value to 1.004 V; if the temperature 134 subsequently rises above 80° C., the voltage/frequency control 104 increases the $V_{dd}$ 142 value to 1.036 V; if the temperature 134 subsequently rises above 90° C., the voltage/frequency control 104 increases the $V_{dd}$ 142 value to 1.068 V; if the temperature 134 subsequently rises above 90° C., the voltage/frequency control 104 increases the $V_{dd}$ 142 value to 1.10 V. As shown in the graph of FIG. 15, the operation of the microprocessor 102 according to the embodiment of FIG. 14 has advantages similar to those of the embodiment of FIG. 5. In addition, the embodiment of FIG. 14 has the advantage of potentially capturing additional power consumption savings over the embodiment of FIG. 5 by providing finer-grained transitions to a lower operating voltage $V_{dd}$ 142 as the operating temperature 134 drops below the successive T[i] values, particularly in operating environments in which the operating temperature 134 rarely reaches the $T_{alt}$ value of FIG. 5. Furthermore, the dual PLL 112 arrangement of the microprocessor 102 advantageously enables making the relatively more frequent operating point transitions of the embodiment of FIG. 14 at effectively no performance cost since the core clock 116 to the core logic 106 does not need to be stopped during the transitions.

Although the present invention and its objects, features, and advantages have been described in detail, other embodiments are encompassed by the invention. For example, although embodiments have been described in which various operating frequencies, voltages, and temperatures have been specified, other embodiments are contemplated in which other values may be employed.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents.

Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A microprocessor, comprising:
   core logic, configured to operate according to a core clock signal in order to execute program instructions;
   clock generation circuitry, controllable to generate the core clock signal having one of N different possible frequencies, wherein N is more than two;
   a control circuit, coupled to the clock generation circuitry, and configured, in response to a request to operate the core logic at a destination frequency, to iteratively control the clock generation circuitry to generate the core clock signal having a new frequency on each of successive frequency iterations until the core clock signal frequency is the destination frequency, wherein the new core clock signal frequency on each of said frequency iterations is one of the N different possible frequencies monotonically closer to the destination frequency, wherein the number of said frequency iterations is between zero and N−1 depending upon the destination frequency specified and the core clock signal frequency when the request is received; and
   an output, configured to provide a signal for controlling an operating voltage of the microprocessor;
   wherein the control circuit is further configured, in response to said receiving the request, to iteratively generate the signal on the output to cause the operating voltage to have a new voltage on each of successive voltage iterations until the operating voltage is a destination voltage associated with the destination frequency.

2. The microprocessor as recited in claim 1, wherein the new voltage on each of said voltage iterations is monotonically closer to the destination voltage.

3. The microprocessor as recited in claim 1, wherein the clock generation circuitry comprises:
   two phase-locked loops (PLLs), each controllable to generate a clock signal having one of N different possible frequencies; and
   a selection circuit, controllable to select one of said PLL clock signals for provision to said core logic as said core clock signal.

4. The microprocessor as recited in claim 3, wherein said control circuit is configured, on each said frequency iteration, to control a non-selected one of the PLLs to generate its clock signal having the new frequency, and to subsequently select the non-selected PLL to provide its clock signal as the core clock signal to the core logic when the non-selected PLL has locked in to the new clock frequency.

5. The microprocessor as recited in claim 1, wherein the clock generation circuitry is configured to receive a bus clock signal having a bus clock frequency, wherein the clock generation circuitry is configured to generate the core clock signal as a multiple of the bus clock frequency.

6. The apparatus as recited in claim 1, wherein the control circuit is configured to iteratively control the clock generation circuitry to generate the core clock signal having a new frequency on each of said successive frequency iterations until the core clock signal frequency is the destination frequency, without suspending operation of the core logic.

7. A method for improving the performance of a microprocessor having core logic configured operate according to a core clock signal in order to execute program instructions, the method comprising:
   receiving a request to operate the core logic at a destination frequency;
   generating a new frequency on the core clock signal, in response said receiving the request, the new frequency being closer to the destination frequency than a current frequency;
   iterating on said generating a new frequency, until the new frequency is the destination frequency, wherein said iterating comprises at least two iterations; and
   iteratively generating a signal to cause an operating voltage of the microprocessor to have a new voltage until the operating voltage is a destination voltage associated with the destination frequency.

8. The method as recited in claim 7, wherein the new voltage on each iteration of said voltage is monotonically closer to the destination voltage.

9. The method as recited in claim 7, wherein the new frequency is one of N different possible frequencies, wherein N is more than two.

10. The method as recited in claim 9, wherein the new frequency on each of said iterations is one of the N different possible frequencies monotonically closer to the destination frequency, wherein the number of said iterations is between zero and N−1 depending upon the destination frequency specified and the core clock signal frequency when the request is received.

11. The method as recited in claim 7, wherein the microprocessor includes two PLLs each configured to generate a respective clock signal, wherein said generating a new frequency comprises:
   causing a non-selected one of the two PLLs to generate the new frequency; and
   selecting the non-selected one of the two PLLs to provide its clock signal as the core clock signal to the core logic.

12. The method as recited in claim 7, wherein said generating and said iterating are performed without suspending operation of the core logic.

13. An apparatus for improving the performance of a microprocessor, comprising:
   a first output, configured to provide a signal to control an operating voltage of the microprocessor;
   a second output, configured to provide a signal to control an operating frequency of the microprocessor;
   an input, configured to receive a request to operate the microprocessor at a destination frequency; and a control circuit, configured, in response to receiving the request on the input, to:

iteratively generate the signal on the second output to operate the microprocessor at a plurality of different values of the operating frequency between a current frequency and the destination frequency; and iteratively generate the signal on the first output to operate the microprocessor at a plurality of different values of the operating voltage between a current voltage and a destination voltage associated with the destination frequency, while transitioning the operating frequency from the current frequency to the destination frequency.

14. The apparatus as recited in claim 13, wherein the control circuit is configured to monotonically change the plurality of the different values of the operating frequency in a direction toward the destination frequency.

15. The apparatus as recited in claim 13, wherein the control circuit is configured to monotonically change the plurality of the different values of the operating voltage in a direction toward the destination voltage.

16. The apparatus as recited in claim 13, wherein the control circuit is configured to transition between the plurality of values of the operating frequency without suspending operation of core logic of the microprocessor.

17. The apparatus as recited in claim 13, further comprising:

an input, configured to receive a bus clock used to generate the plurality of values of the operating frequency;

wherein the control circuit is configured to transition the operating frequency within a cycle of the bus clock on each iteration of the operating frequency.

18. The apparatus as recited in claim 13, wherein the control circuit is configured to transition the operating frequency in less than one hundred nanoseconds on each iteration of the operating frequency.

19. The apparatus as recited in claim 13, wherein the control circuit is configured to alternately select between two phase-locked loops (PLLs) to provide a core clock signal at the current frequency to core logic of the microprocessor.

20. The apparatus as recited in claim 13, wherein the control circuit is configured to store information for associating each of the plurality of different values of the operating frequency with one of the plurality of different values of the operating voltage.

21. A computer program product for use with a computing device, the computer program product comprising:

a computer usable storage medium, having computer readable program code embodied in said medium, for providing a microprocessor, said computer readable program code comprising:

first program code for providing core logic, configured to operate according to a core clock signal in order to execute program instructions;

second program code for providing clock generation circuitry, controllable to generate the core clock signal having one of N different possible frequencies, wherein N is more than two;

third program code for providing a control circuit, coupled to the clock generation circuitry, and configured, in response to a request to operate the core logic at a destination frequency, to iteratively control the clock generation circuitry to generate the core clock signal having a new frequency on each of successive frequency iterations until the core clock signal frequency is the destination frequency, wherein the new core clock signal frequency on each of said frequency iterations is one of the N different possible frequencies monotonically closer to the destination frequency, wherein the number of said frequency iterations is between zero and N−1 depending upon the destination frequency specified and the core clock signal frequency when the request is received; and fourth program code for providing an output, configured to provide a signal for controlling an operating voltage of the microprocessor;

wherein the control circuit is further configured, in response to said receiving the request, to iteratively generate the signal on the output to cause the operating voltage to have a new voltage until the operating voltage is a destination voltage associated with the destination frequency.

22. The computer program product as recited in claim 21, wherein the control circuit is configured to iteratively control the clock generation circuitry to generate the core clock signal having a new frequency until the core clock signal frequency is the destination frequency, without suspending operation of the core logic.

23. A method for improving the performance of a microprocessor, the method comprising:

receiving a request to operate the microprocessor at a destination frequency;

iteratively generating a first signal to operate the microprocessor at a plurality of different values of its operating frequency between a current frequency and the destination frequency; and iteratively generating a second signal to operate the microprocessor at a plurality of different values of its operating voltage between a current voltage and a destination voltage associated with the destination frequency, while transitioning the operating frequency from the current frequency to the destination frequency.

24. The method as recited in claim 23, wherein the plurality of different values of the operation frequency are monotonically changing in a direction toward the destination frequency.

25. The method as recited in claim 23, wherein said iteratively generating a first signal to operate the microprocessor at a plurality of different values of its operating frequency is performed without suspending operation of core logic of the microprocessor.

26. The method as recited in claim 23, wherein said iteratively generating a first signal to operate the microprocessor at a plurality of different values of its operating frequency comprises alternately selecting between two phase-locked loops (PLLs) to provide a core clock signal of the current frequency to core logic of the microprocessor.

27. A method for improving the performance of a microprocessor having core logic configured operate according to a core clock signal in order to execute program instructions, the method comprising:

receiving a request to operate the core logic at a destination frequency;

generating a new frequency on the core clock signal, in response said receiving the request, the new frequency being closer to the destination frequency than a current frequency;

iterating on said generating a new frequency, until the new frequency is the destination frequency, wherein said iterating comprises at least two iterations;

wherein the microprocessor includes two PLLs each configured to generate a respective clock signal, wherein said generating a new frequency comprises:
  causing a non-selected one of the two PLLs to generate the new frequency; and
  selecting the non-selected one of the two PLLs to provide its clock signal as the core clock signal to the core logic.

* * * * *